United States Patent
Kim et al.

(10) Patent No.: US 10,313,217 B2
(45) Date of Patent: Jun. 4, 2019

(54) SYSTEM ON CHIP (SOC) CAPABLE OF SHARING RESOURCES WITH NETWORK DEVICE AND DEVICES HAVING THE SOC

(71) Applicant: SAMSUNG ELECTRONICS CO., LTD., Suwon-si (KR)

(72) Inventors: Jin Min Kim, Seoul (KR); Bo Gyeong Kang, Seoul (KR); Myung Koo Kang, Seoul (KR); Dae Hwan Kim, Yongin-si (KR); Byung Se So, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 15/066,152

(22) Filed: Mar. 10, 2016

(65) Prior Publication Data

US 2016/0269259 A1    Sep. 15, 2016

Related U.S. Application Data

(60) Provisional application No. 62/132,837, filed on Mar. 13, 2015.

(30) Foreign Application Priority Data

May 7, 2015    (KR) .................. 10-2015-0063958

(51) Int. Cl.
*H04L 12/26* (2006.01)
*H04L 12/911* (2013.01)
(Continued)

(52) U.S. Cl.
CPC ...... *H04L 43/0817* (2013.01); *H04L 41/0896* (2013.01); *H04L 47/70* (2013.01);
(Continued)

(58) Field of Classification Search
CPC . H04L 41/0896; H04L 43/0817; H04L 47/70; H04L 67/10; H04L 67/30; H04L 67/34
See application file for complete search history.

(56) References Cited

U.S. PATENT DOCUMENTS

| 5,381,339 A | 1/1995 | Yoko et al. |
| 6,502,411 B2 | 1/2003 | Okamoto |

(Continued)

FOREIGN PATENT DOCUMENTS

| JP | 2006-057906 A | 3/2006 |
| JP | 2007-293811 A | 11/2007 |

(Continued)

OTHER PUBLICATIONS

Anthony, Sebastian; "SoC vs. CPU—The Battle for the Future of Computing," Apr. 19, 2012.*

*Primary Examiner* — Alina A Boutah
(74) *Attorney, Agent, or Firm* — Sughrue Mion, PLLC

(57) ABSTRACT

A system on chip structured in a second network device is provided. The system on chip includes: a first resource which is structured as at least one of hardware and software; a resource management module; and a processor configured to control or execute the resource management module to monitor a state of the first resource, and manage a sharing condition of the first resource to be shared by a first network device and the second network device and shared information of at least one second resource which is hardware and/or software, currently shared by the second network device and a third network device.

20 Claims, 37 Drawing Sheets

(51) Int. Cl.
*H04L 29/08* (2006.01)
*H04L 12/24* (2006.01)

(52) U.S. Cl.
CPC .............. *H04L 67/10* (2013.01); *H04L 67/30* (2013.01); *H04L 67/34* (2013.01)

(56) References Cited

U.S. PATENT DOCUMENTS

| | | |
|---|---|---|
| 6,870,480 B2 | 3/2005 | Suzuki et al. |
| 7,486,584 B2 | 2/2009 | Kajigaya |
| 7,861,284 B2 | 12/2010 | Okamoto et al. |
| 8,020,197 B2 | 9/2011 | Shiran et al. |
| 8,495,729 B2 | 7/2013 | Park |
| 8,532,304 B2 | 9/2013 | Asokan et al. |
| 8,606,878 B2 | 12/2013 | Ferris |
| 8,671,099 B2 | 3/2014 | Kapoor et al. |
| 8,683,567 B2 | 3/2014 | Kim et al. |
| 8,707,456 B2 | 4/2014 | Kim et al. |
| 8,762,642 B2 | 6/2014 | Bates et al. |
| 8,813,169 B2 | 8/2014 | Shieh et al. |
| 8,954,741 B2 | 2/2015 | Suh et al. |
| 8,977,754 B2 | 3/2015 | Curry, Jr. et al. |
| 9,014,199 B2 | 4/2015 | Park et al. |
| 9,026,400 B2 | 5/2015 | Chen et al. |
| 2003/0167270 A1* | 9/2003 | Werme ................ G06F 9/06 707/999.001 |
| 2005/0192969 A1* | 9/2005 | Haga ................ G06Q 10/02 |
| 2006/0112269 A1 | 5/2006 | Uh et al. |
| 2008/0163143 A1* | 7/2008 | Kwon ................ G06F 17/5022 716/107 |
| 2009/0031049 A1* | 1/2009 | Lien ................ G06F 3/023 710/6 |
| 2011/0302632 A1 | 12/2011 | Garrett et al. |
| 2012/0185864 A1* | 7/2012 | Toukmaji ............. G06F 9/4881 718/104 |
| 2012/0303323 A1 | 11/2012 | Ha et al. |
| 2012/0331286 A1 | 12/2012 | Choi et al. |
| 2013/0007413 A1* | 1/2013 | Thomson ................ G06F 1/324 712/30 |
| 2013/0198185 A1 | 8/2013 | Kapoor et al. |
| 2013/0212367 A1 | 8/2013 | Ingalls et al. |
| 2013/0262894 A1* | 10/2013 | Lee ................ G06F 1/324 713/322 |
| 2013/0268257 A1* | 10/2013 | Hu ................ G06F 17/5009 703/22 |
| 2013/0346966 A1* | 12/2013 | Natu ................ G06F 9/45558 718/1 |
| 2014/0047031 A1 | 2/2014 | Garcia, Jr. et al. |
| 2014/0047099 A1 | 2/2014 | Flores et al. |
| 2014/0195684 A1* | 7/2014 | Taaghol ............ H04L 29/08171 709/226 |
| 2014/0196048 A1* | 7/2014 | Mathur ................ G06F 9/485 718/104 |
| 2014/0258717 A1 | 9/2014 | Baek et al. |
| 2014/0317734 A1* | 10/2014 | Valencia ............... G06F 21/552 726/22 |
| 2014/0380403 A1* | 12/2014 | Pearson ................ G06F 21/60 726/1 |
| 2015/0007263 A1 | 1/2015 | Stewart et al. |
| 2015/0007283 A1 | 1/2015 | Brugger et al. |
| 2015/0012977 A1 | 1/2015 | Huh et al. |
| 2015/0127375 A1 | 5/2015 | Hwang et al. |
| 2015/0128215 A1 | 5/2015 | Son et al. |
| 2015/0309809 A1* | 10/2015 | Shin .......................... G06F 9/48 718/100 |
| 2015/0350095 A1* | 12/2015 | Raney ................ H04L 47/2441 709/223 |
| 2016/0029204 A1* | 1/2016 | Lalwaney ............... H04W 8/22 455/418 |
| 2016/0085594 A1* | 3/2016 | Wang ..................... H04L 67/18 709/226 |
| 2016/0182398 A1* | 6/2016 | Davis ................. G06F 12/0811 710/313 |
| 2016/0239445 A1* | 8/2016 | Davis .................... G06F 13/364 |
| 2016/0306677 A1* | 10/2016 | Hira ...................... G06F 9/5083 |
| 2016/0306678 A1* | 10/2016 | Hira ...................... G06F 9/5083 |
| 2017/0011098 A1* | 1/2017 | Tsirulnik ........... G06F 17/30315 |
| 2017/0024135 A1* | 1/2017 | Christodorescu ..... G06F 3/0604 |

FOREIGN PATENT DOCUMENTS

| | | |
|---|---|---|
| JP | 2009-048646 A | 3/2009 |
| JP | 2009-302681 A | 12/2009 |
| JP | 2013-167932 A | 8/2013 |
| JP | 2014-175698 A | 9/2014 |
| JP | 2015-042210 A | 3/2015 |
| KR | 10-2002-0006816 A | 1/2002 |
| KR | 10-0511950 B1 | 9/2005 |
| KR | 10-0882901 B1 | 2/2009 |
| KR | 10-0988649 B1 | 10/2010 |
| KR | 10-2013-0097591 A | 9/2013 |
| KR | 10-2014-0028238 A | 3/2014 |
| KR | 10-1485829 B1 | 1/2015 |
| KR | 10-2015-0043992 A | 4/2015 |

* cited by examiner

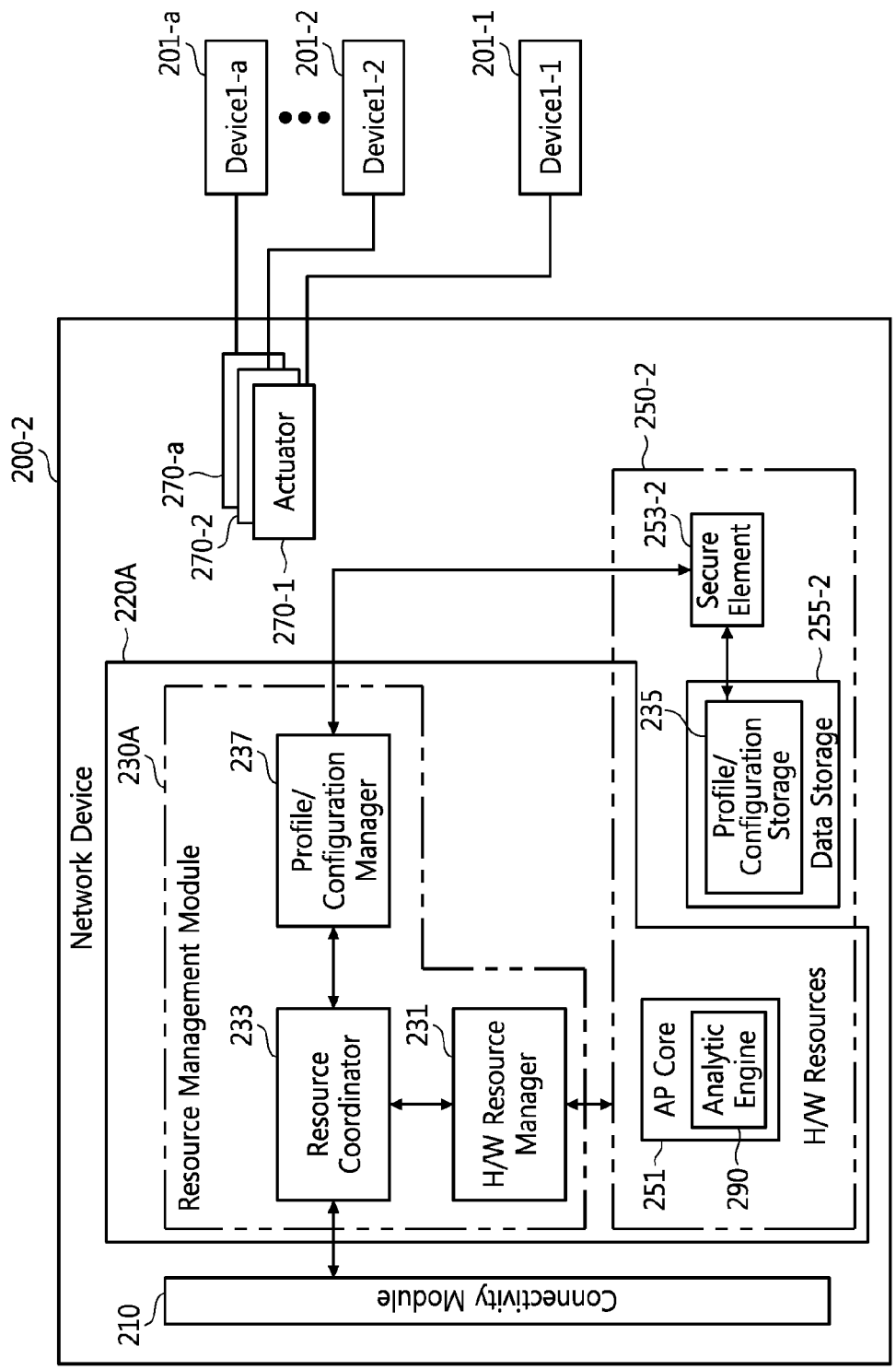

FIG. 4

| Network Device | Shared Resource |
|---|---|
| Network Device #2 | · AP Core 2<br>· Data Storage 2<br>· Device 2-1 |
| Network Device #3 | · AP Core 3<br>· Data Storage 3<br>· Device 3-1<br>· Device 3-2<br>•••<br>· Device 3-c |
| Network Device #4 | · AP Core 4<br>· Data Storage 4<br>· Device 4-1<br>· Device 4-2 |
| Network Device #5 | · AP Core 5<br>· Device 5-1<br>· Device 5-e |
| Network Device #6 | · AP Core 6<br>· Device 6-2<br>· Device 6-f |

235-2
PCI1

FIG. 5

| Network Device | Shared Resource |
|---|---|
| Network Device #3 | · AP Core 3<br>· Data Storage 3<br>· Device 3-1<br>· Device 3-2 |
| Network Device #2 | · AP Core 2<br>· Data Storage 2<br>· Device 2-1<br>· Device 2-2<br>· Device 2-b |
| Network Device #6 | · Device 6-2 |
| Network Device #4 | · AP Core 4<br>· Secure Element<br>· Device 4-1<br>· Device 4-2 |
| Network Device #5 | · Data Storage 5<br>· Device 5-1<br>· Device 5-e |

235-3

PCI2

SYSTEM ON CHIP (SOC) CAPABLE OF SHARING RESOURCES WITH NETWORK DEVICE AND DEVICES HAVING THE SOC

CROSS-REFERENCE TO THE RELATED APPLICATIONS

This application claims priority from U.S. provisional patent application No. 62/132,837 filed on Mar. 13, 2015, and Korean Patent Application No. 10-2015-0063958 filed on May 7, 2015, the entire disclosures of which are incorporated herein by reference.

BACKGROUND

Apparatuses and methods consistent with exemplary embodiments of the inventive concept relate to a system on chip (SoC), and more particularly, to a SoC capable of sharing at least one of hardware resources and/or software resources of a network device through connection with the network device, and devices including the same.

SUMMARY

According to some exemplary embodiments of the inventive concept, there is provided a system on chip structured in a second network device. The system on chip may include: a first resource which is structured as at least one of hardware and software; a resource management module; and a processor configured to control or execute the resource management module to monitor a state of the first resource, and manage a sharing condition of the first resource to be shared by a first network device and the second network device and shared information of at least one second resource which is hardware and/or software, currently shared by the second network device and a third network device.

The sharing condition may include at least one of a manufacturer name and a model name of the first network device which shares the first resource with the second network device, and the shared information may include at least one of information about the third network device and information about the second resource.

The second resource may be included in one of the second network device and the third network device, and include at least one of the processor included in the system on chip, a processor of the third network device, a data storage, a sensor node, and an analytic engine configured to process data.

The resource management module may include: a resource coordinator configured to manage sharing of the first resource and sharing of the second resource between the two network devices; a resource manager configured to monitor a current state of the first resource and transmit a monitoring result to the resource coordinator; and a manager configured to manage update and storing of the sharing condition and the shared information.

When the first hardware resource is the processor which is a central processing unit (CPU) of the system on chip, the current state may include at least one of CPU utilization, CPU usage, and CPU occupancy a central processing unit (CPU), the current state may include at least one among CPU utilization, CPU usage, and CPU occupancy.

The resource management module may transmit an analytic engine and data from the first network device to the first hardware resource. The first hardware resource may analyze the data using the analytic engine and transmit analyzed data to the first network device through the resource management module.

When the first resource is the processor which is a first CPU and the second resource is a second CPU included in the third network device, the resource management module may transmit an analytic engine and data from the first network device to either of the first and second CPUs based on usage of the first CPU and usage of the second CPU. When either of the first and second CPUs analyzes the data using the analytic engine and outputs analyzed data, the resource management module may receive the analyzed data and transmit the analyzed data to the first network device.

The system on chip may further include an actuator configured to actuate either a driving device or a sensor node. The resource management module may transmit an actuation instruction from the first network device to the actuator and the actuator may control actuation of either the driving device or the sensor node in response to the actuation instruction.

The first resource may include an analytic engine. The resource management module may transmit data from the first network device to the analytic engine, the analytic engine may analyze the data to generate analyzed data, and the resource management module may transmit the analyzed data to the first network device.

According to some exemplary embodiments of the inventive concept, there is provided a system on chip structured in a first network device. The system on chip may include: a first resource; a resource management module; and a processor configured to control or execute the resource management module to monitor a state of the first resource and a state of at least one second resource included in at least one second network device, respectively, and select at least one of the first network device and the second network device based on a result of the monitoring so that the resource included in the selected network device is used by the first network device, wherein each of the first and second resources is structured as at least one of hardware and software. The resource management module may receive an instruction from a user regarding the selection of the at least one network device, transmit information about the result of the processing the data to the user, and receive an instruction to control a device connected to at least one of the first and second network devices related to the result of the processing the data The resource management module may transmit to the selected network device, at least one of data obtained by the first network device and an analytic engine used to process the data, and receive a result of the processing the data.

According to some exemplary embodiments of the inventive concept, there is provided a second network device including a first resource which is structured as at least one of hardware and software; a resource management module; and a processor configured to control or execute the resource management module to monitor a state of the first resource and control sharing of at least one of the first resource of the second network device and a second resource included in a third network device by at least two of a first network device, the second network device and the third network device, based on information about the first, second and third network devices.

The second network device may further include a memory configured to store the information about the first, second and third network devices. The resource management module may transmit at least a part of the information about the first, second and third network devices from the memory to the first network device in response to an information transmission request output from the first network device.

Alternatively, the second network device may further include a memory configured to store the information about the first, second and third network devices. At this time, the resource management module may transmit a device information request signal to the first network device in response to an information request signal received from the first network device, receive device information from the first network device, determine whether the first and second network devices are compatible with each other based on the device information, and transmit at least a part of the information about the first, second and third network devices from the memory to the first network device in response to determining that the first and second network devices are compatible.

When the first resource is a first CPU and the second resource is the processor which is a second CPU included in the third network device, the resource management module may transmit an analytic engine and data from the first network device to either of the first and second CPUs based on usage of the first CPU and usage of the second CPU. When either of the first and second CPUs analyzes the data using the analytic engine and outputs analyzed data, the resource management module may receive the analyzed data and transmit the analyzed data to the first network device.

BRIEF DESCRIPTION OF THE DRAWINGS

The above and other features and advantages of the inventive concept will become more apparent by describing in detail exemplary embodiments thereof with reference to the attached drawings, in which:

FIG. 4 is a diagram of profile/configuration stored in a profile/configuration storage included in a second network device illustrated in FIG. 3, according to some exemplary embodiments of the inventive concept;

FIG. 5 is a diagram of profile/configuration stored in a profile/configuration storage included in a third network device illustrated in FIG. 3, according to some exemplary embodiments of the inventive concept;

DETAILED DESCRIPTION OF THE EXEMPLARY EMBODIMENTS

Figure 1A:
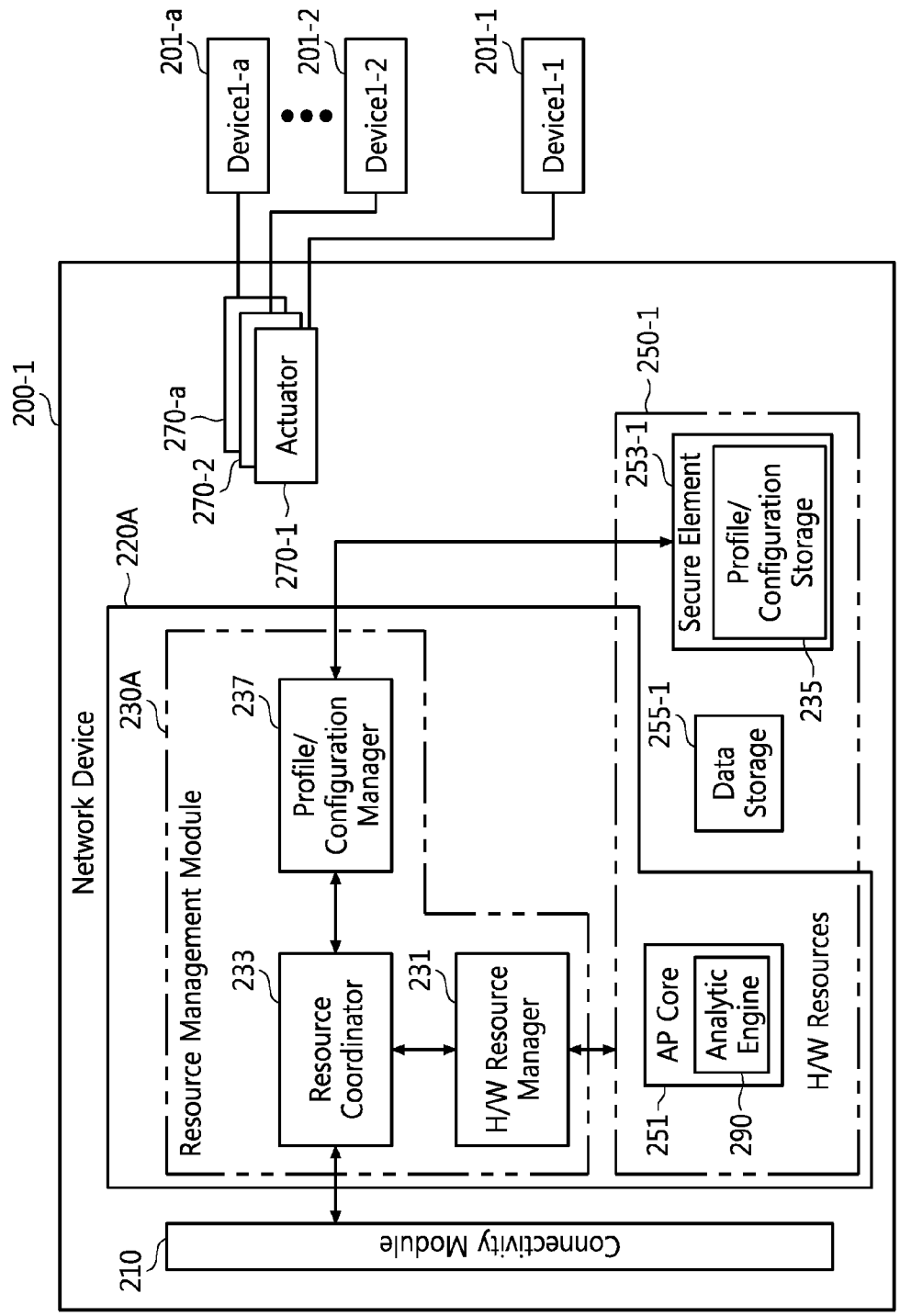
FIGS. 1A through 1N are block diagrams of network devices according to some exemplary embodiments of the inventive concept.

The inventive concept now will be described more fully hereinafter with reference to the accompanying drawings, in which exemplary embodiments of the inventive concept are shown. This inventive concept may, however, be embodied in many different forms and should not be construed as limited to the embodiments set forth herein. Rather, these embodiments are provided such that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the inventive concept.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A network device (e.g., 200-1 shown in FIG. 1A to be described below) may be a sink node, a hub, a gateway, an Internet of things (IoT) device, an Internet of everything (IoE) device, a wearable computing device, home appliance, industrial equipment, military equipment, healthcare equipment, medical equipment, agriculture equipment, an automobile (or a car), or a vehicle, but not being restricted to thereto. In a wireless sensor network (WSN), a sink node is called a base station. The sink node may function as a gateway connecting the WSN with an external network (e.g., the Internet), and may assign each sensor node a task and may collect an event detected by each sensor node.

The term "hub" may refer to a networking device that connects computers or different network devices with each other. A gateway is a node or a router on a transmission control protocol/internet protocol (TCP/IP) network and may function as an access point toward another network.

Hereinafter, a device (e.g., 201-1 or 201-1') connected to the network device through a wired or wireless network may refer to a sink node, a hub, a gateway, an IoT device, an IoE device, or a sensor node, but the inventive concept is not restricted to these examples. For instance, a sensor node may be a node that performs processing and gathering of sensory information and performs communication among connected nodes in a WSN.

The network device (e.g., 200-1) or the device (e.g., 201-1 or 201-1') that can communicate with the network device has an accessible wired/wireless interface. It may include equipment that can transmit or receive data to or from at least one another network device or at least one another device through the wired/wireless interface.

An accessible wired/wireless interface (e.g., a connective module 210) may include a modem communication interface accessible to a local area network (LAN), a wireless LAN (WLAN) such as wireless fidelity (Wi-Fi), a wireless personal area network (WPAN) such as Bluetooth, a wireless universal serial bus (USB), Zigbee, near field communication (NFC), a radio-frequency identification (RFID), or a mobile cellular network. The mobile cellular network may be a third generation (3G) mobile cellular network, a fourth generation (4G) mobile cellular network, or a long term evolution (LTE™) mobile cellular network. The Bluetooth interface may support Bluetooth low energy (BLE). The connectivity module 210 illustrated in FIGS. 1A through 1N may be or may include a wired interface, a wireless interface, or a modem communication interface.

The terms "module", "coordinator", "manager", "engine", or "secure element" may refer to hardware (or a hardware component), software or a functional and/or structural combination thereof that can perform functions and/or operations corresponding to its name, or an electronic recording medium (e.g., a processor or a central processing unit (CPU)) storing a computer program code for executing the functions and/or operations, but the inventive concept is not restricted thereto.

Figure 1C:
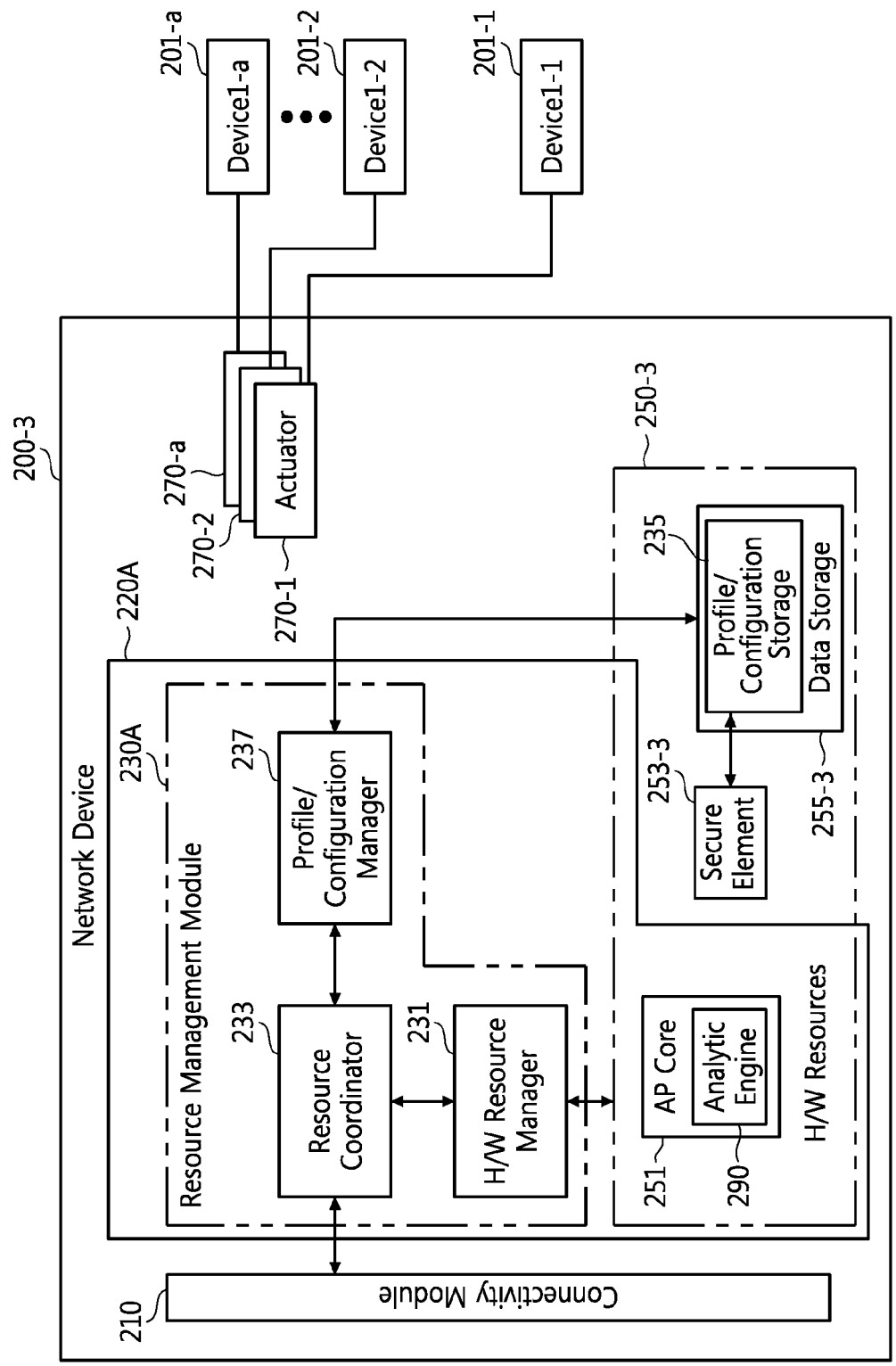
Figure 1D:
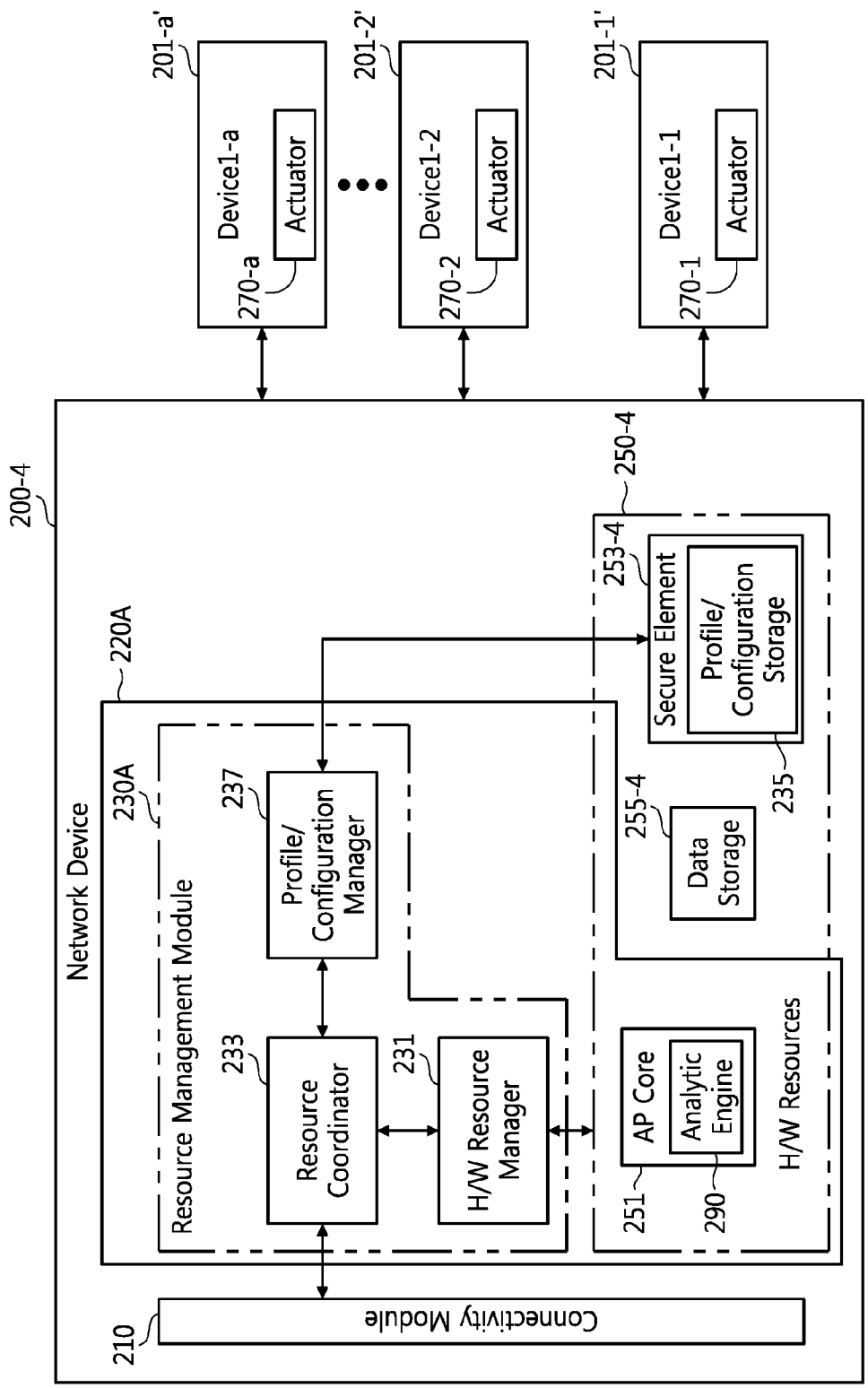
Figure 1E:
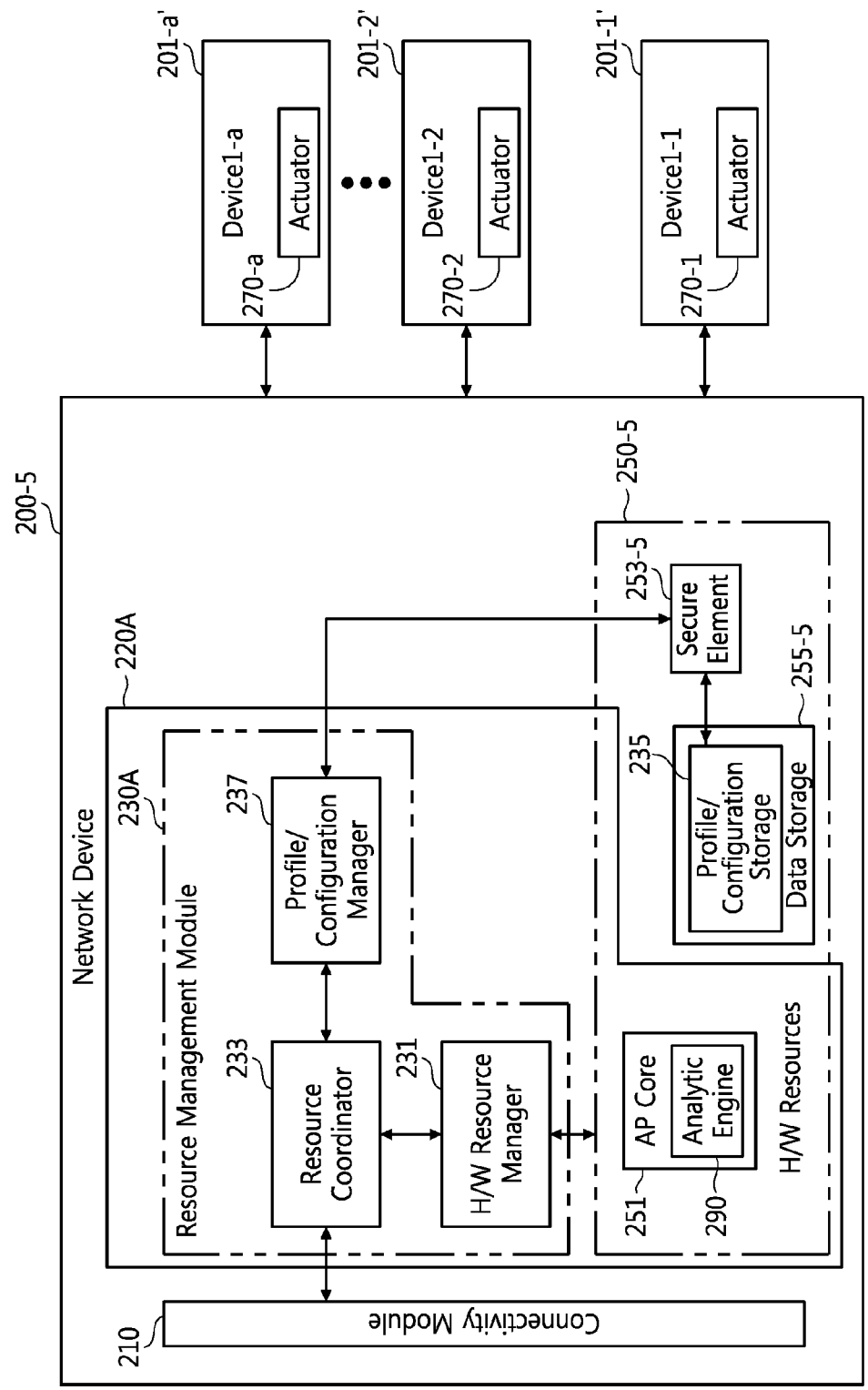
Figure 1F:
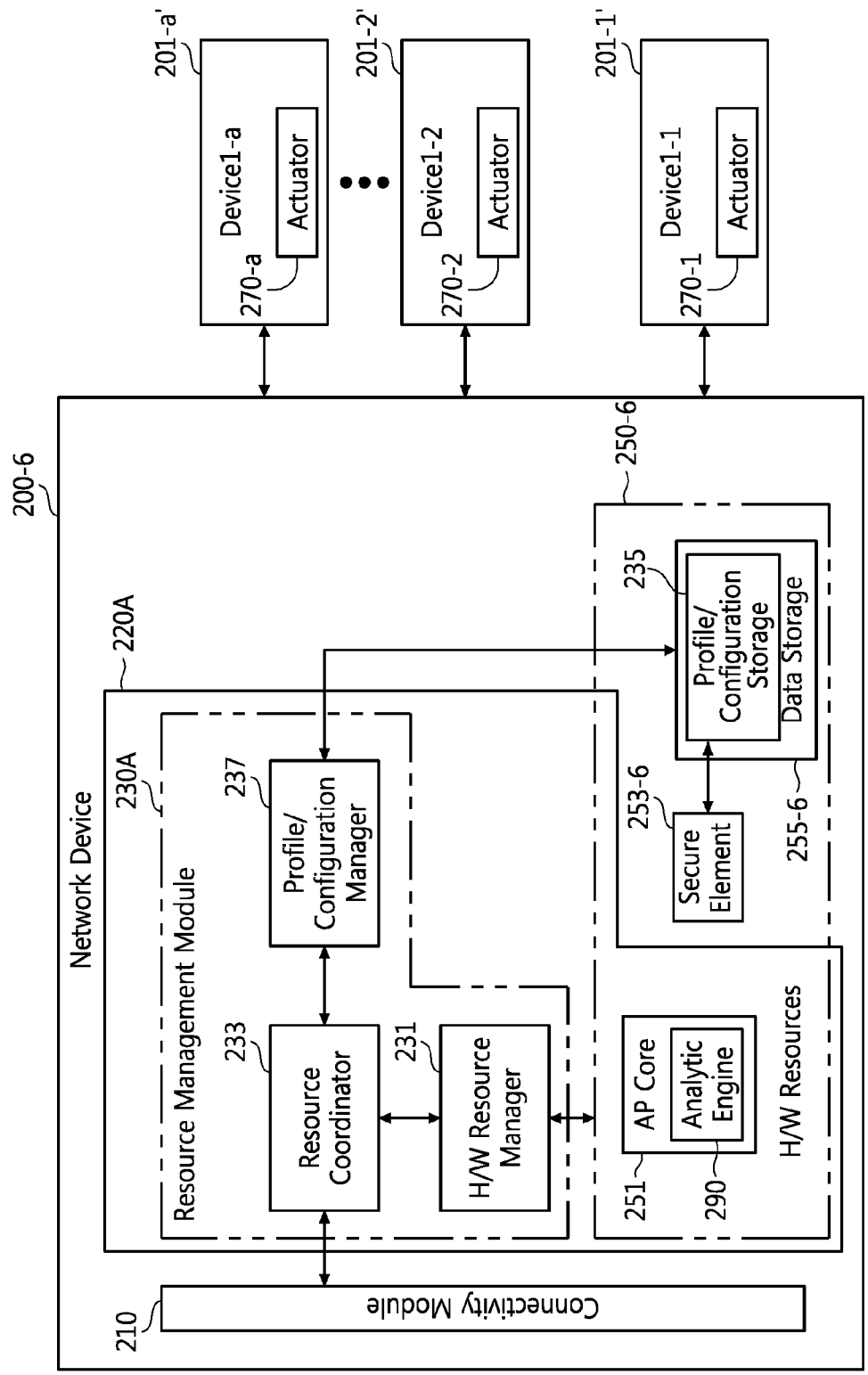
Figure 1G:
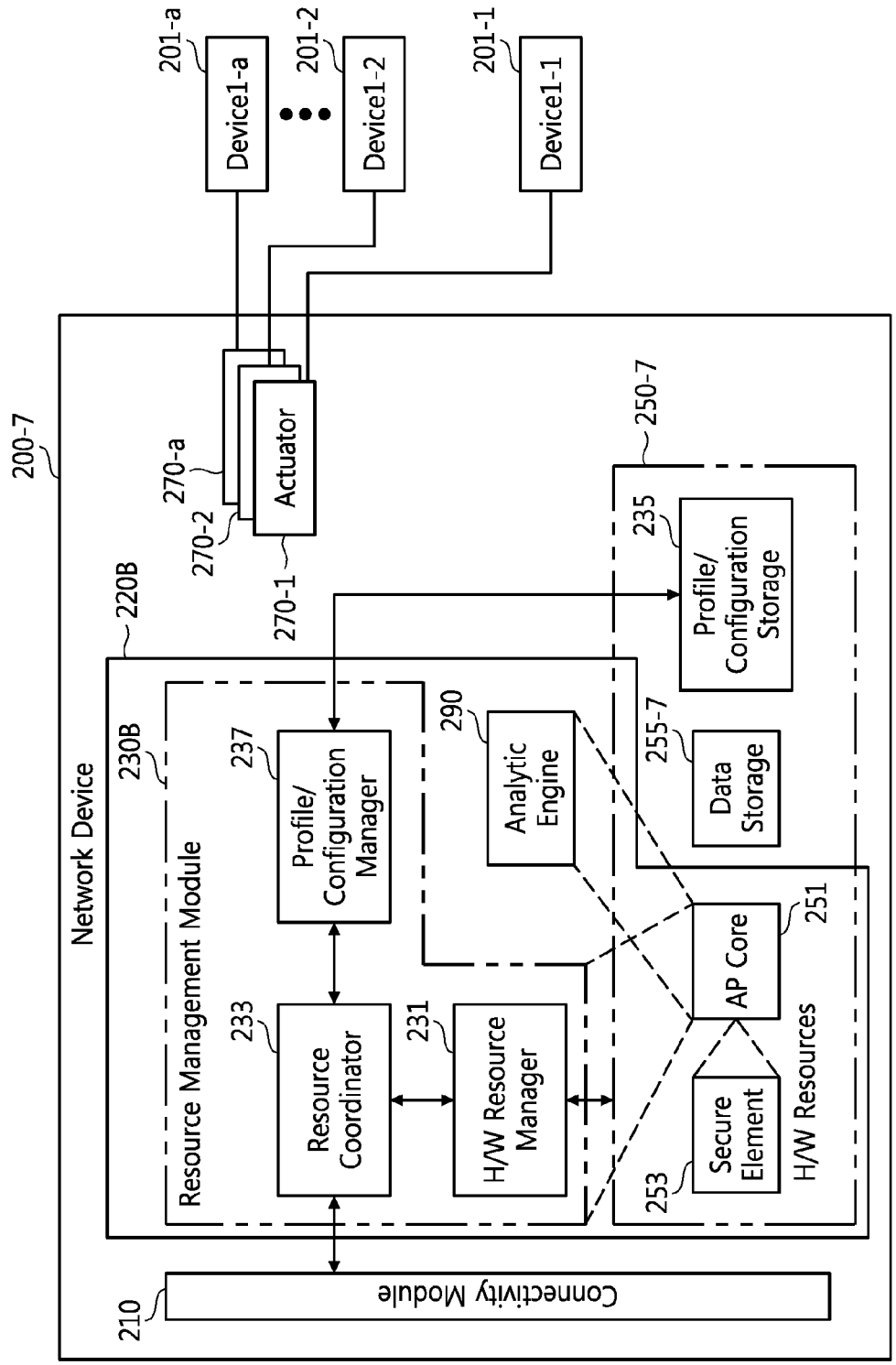
Figure 1H:
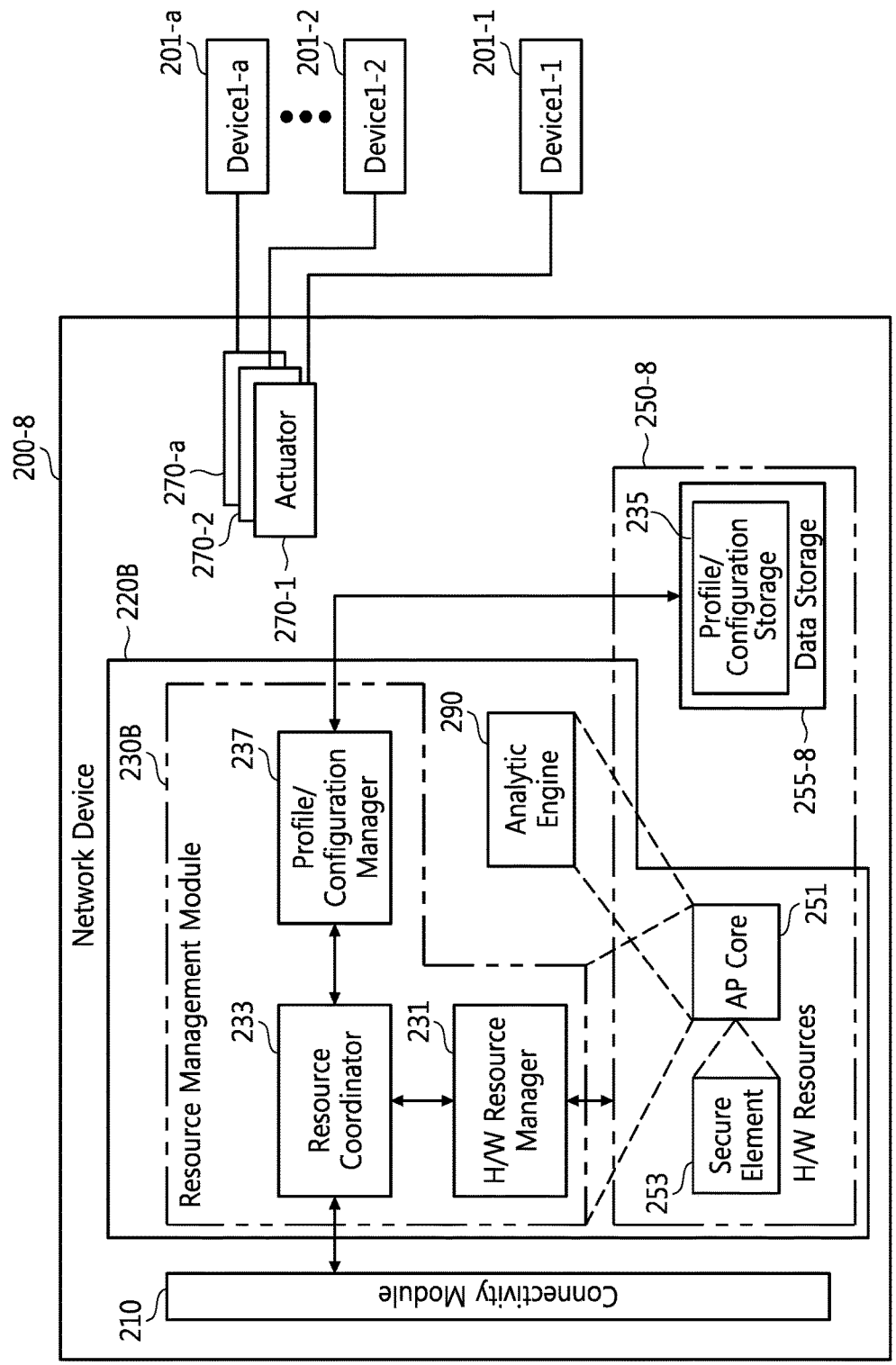
Figure 1I:
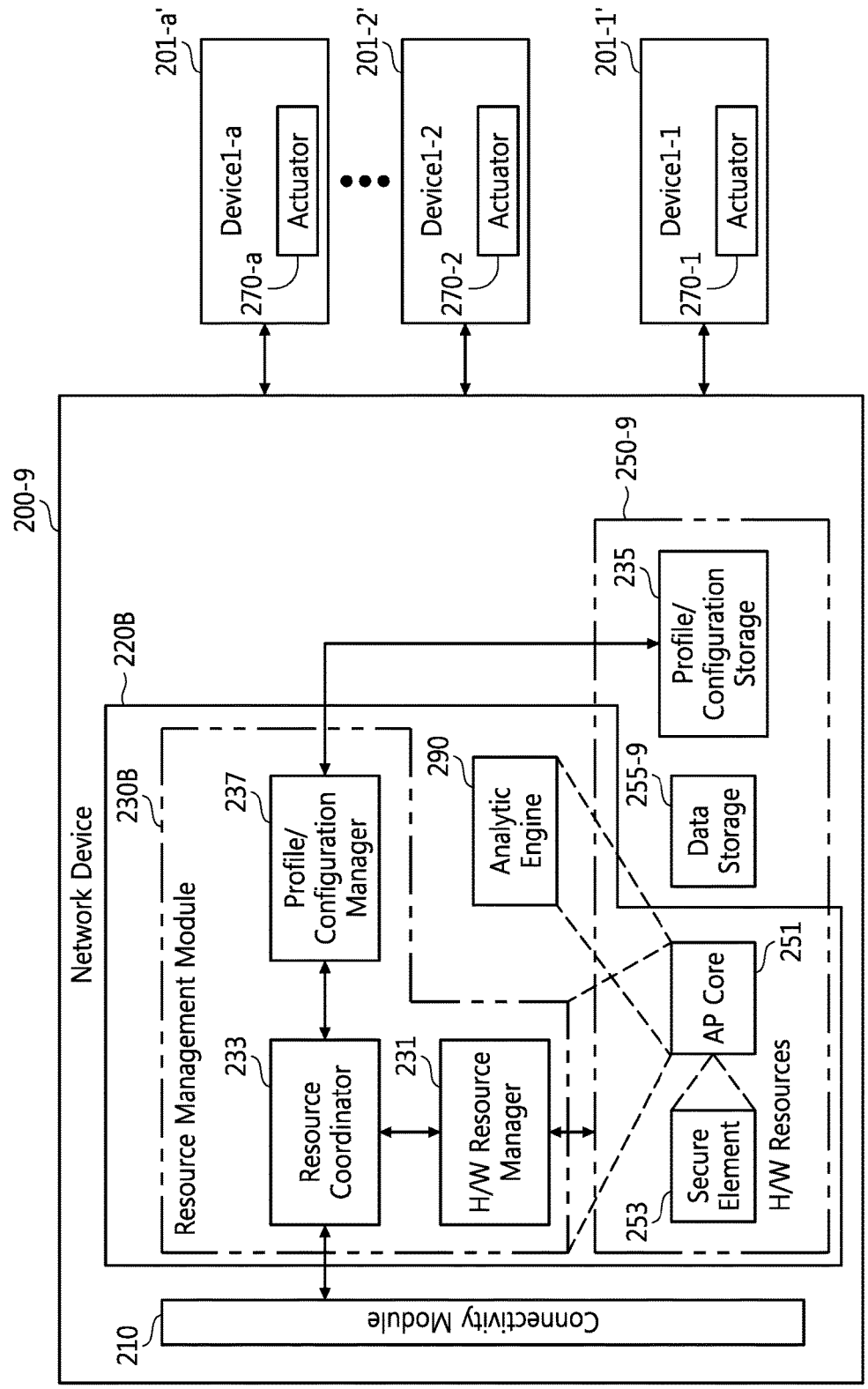
Figure 1J:
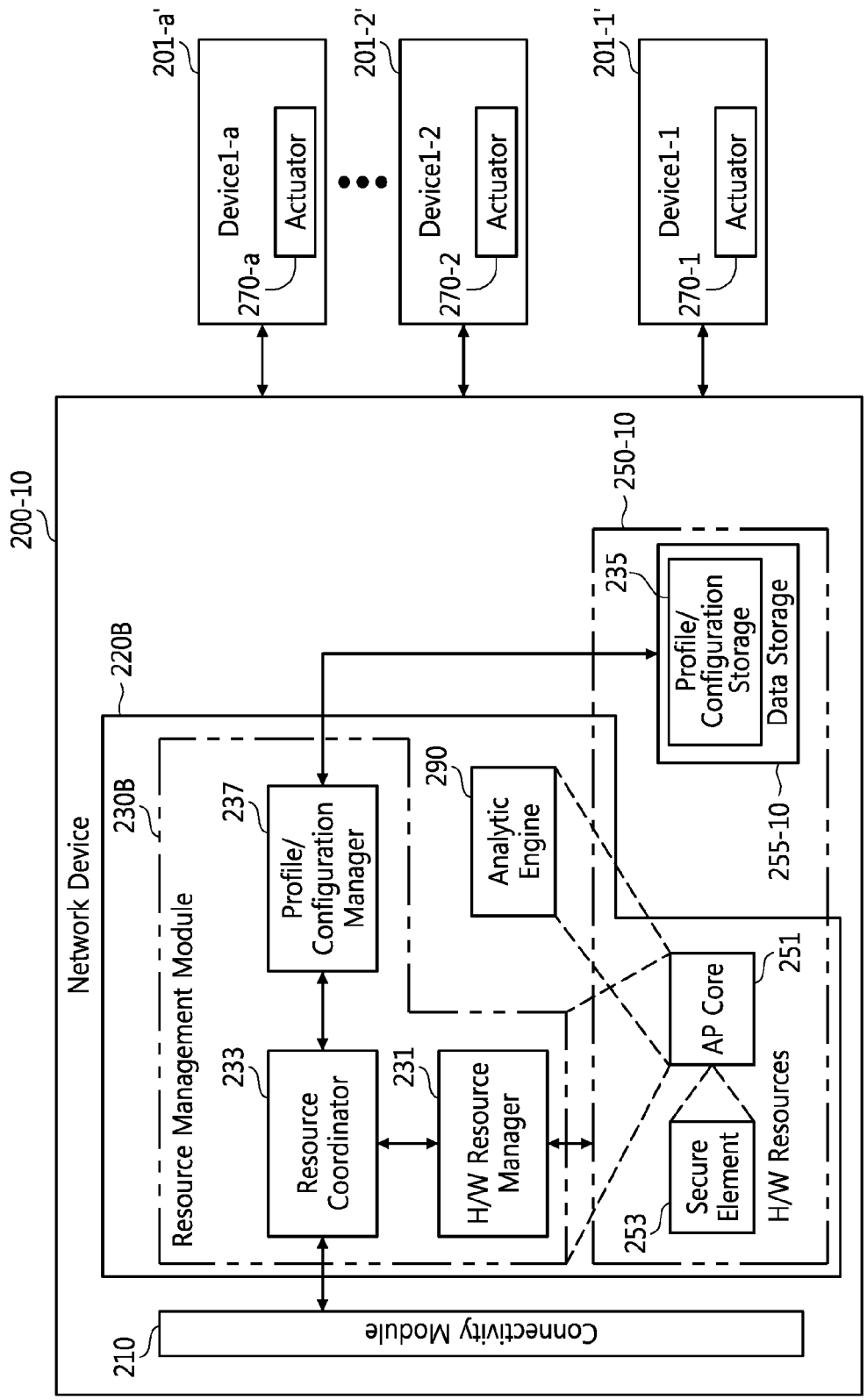
Figure 1K:
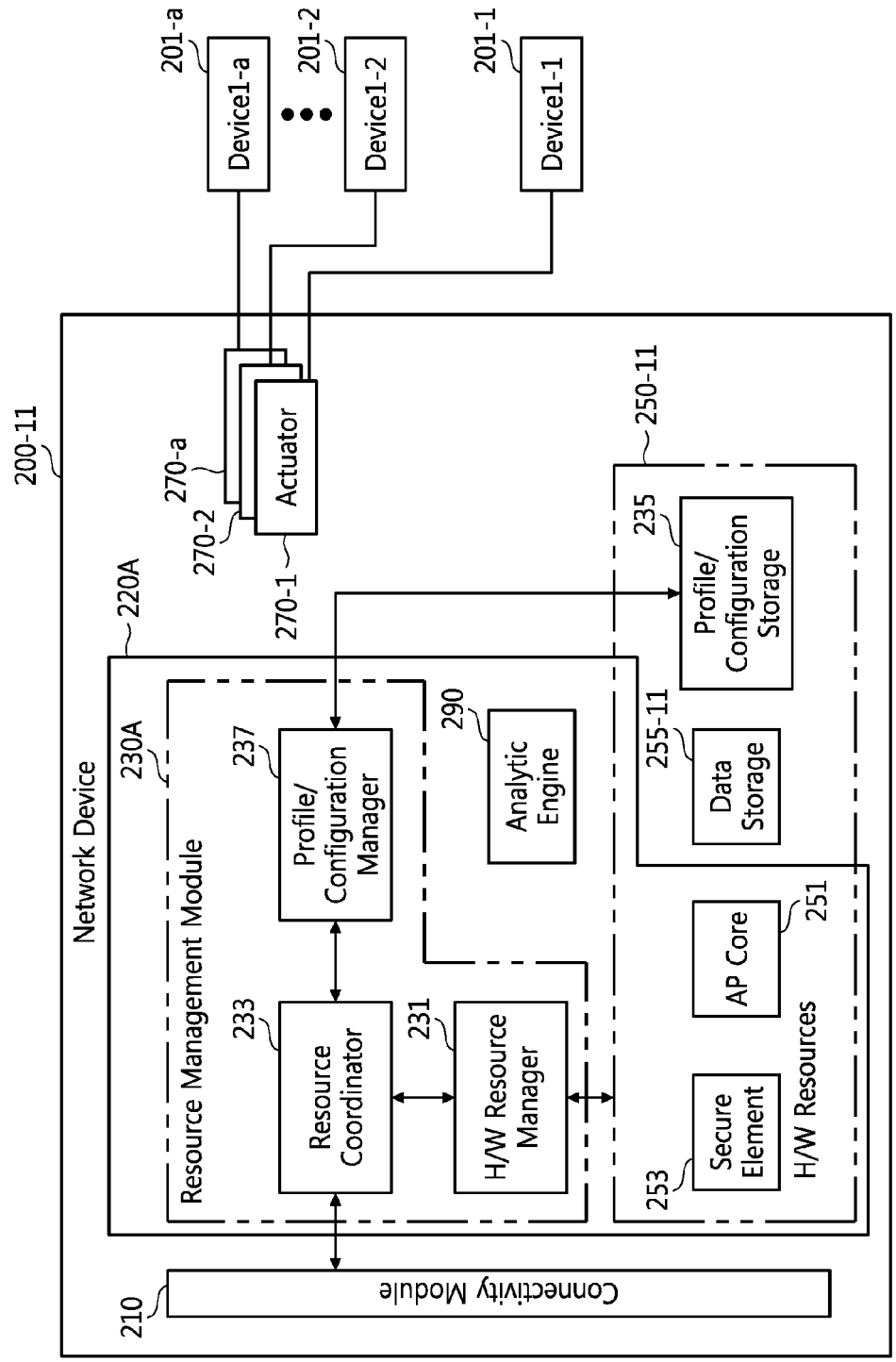
Figure 1L:
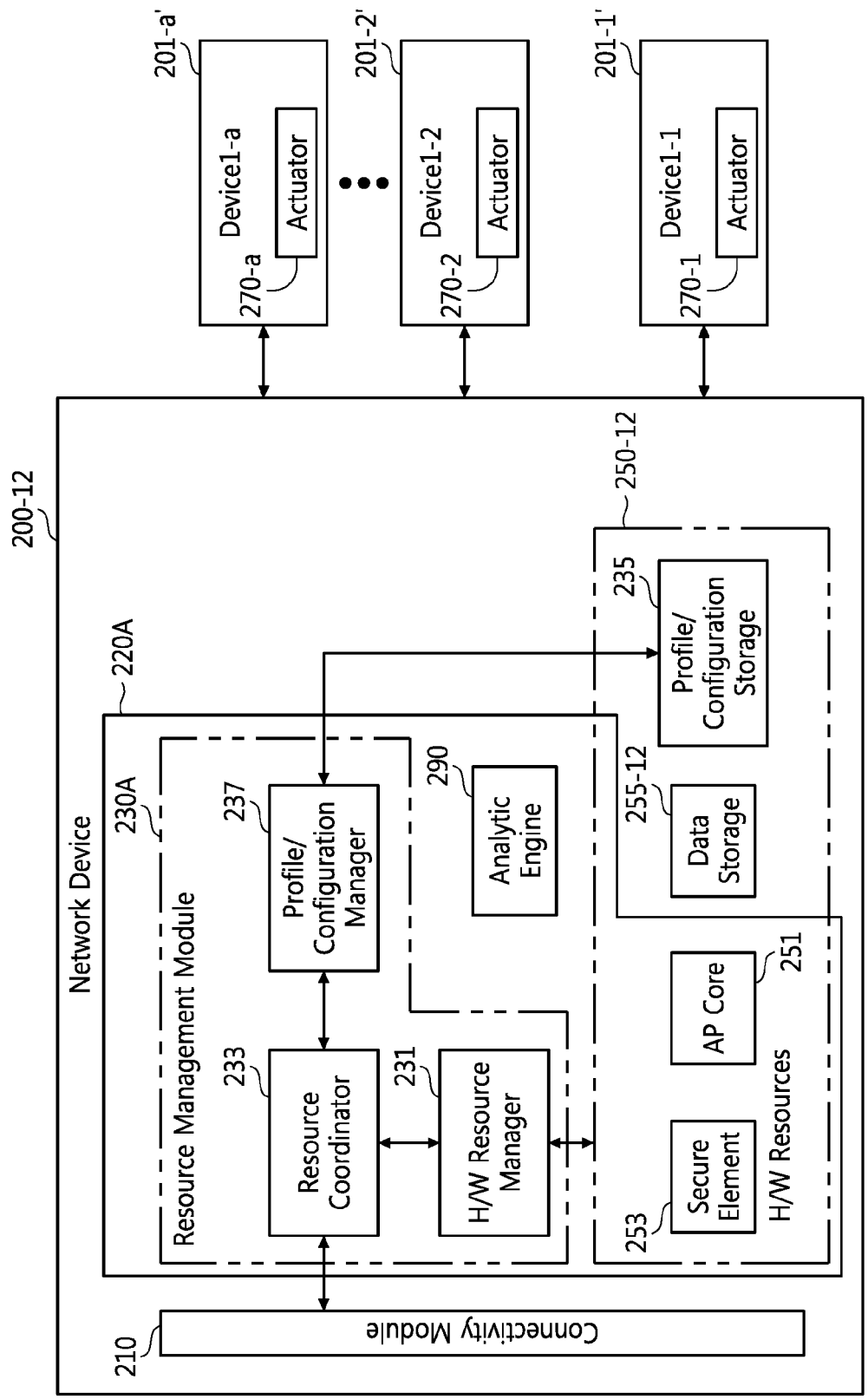
Figure 1M:
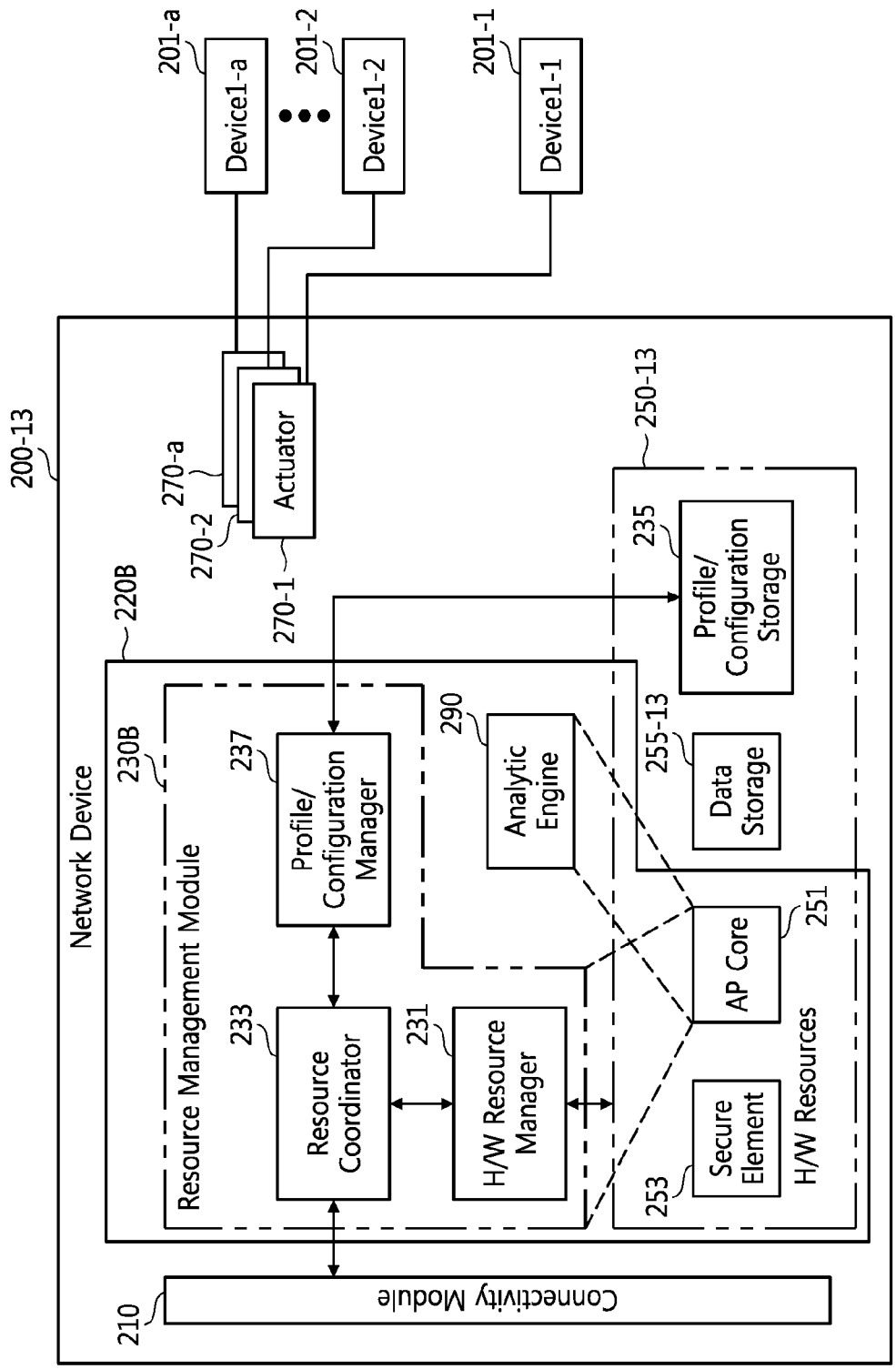
Figure 1N:
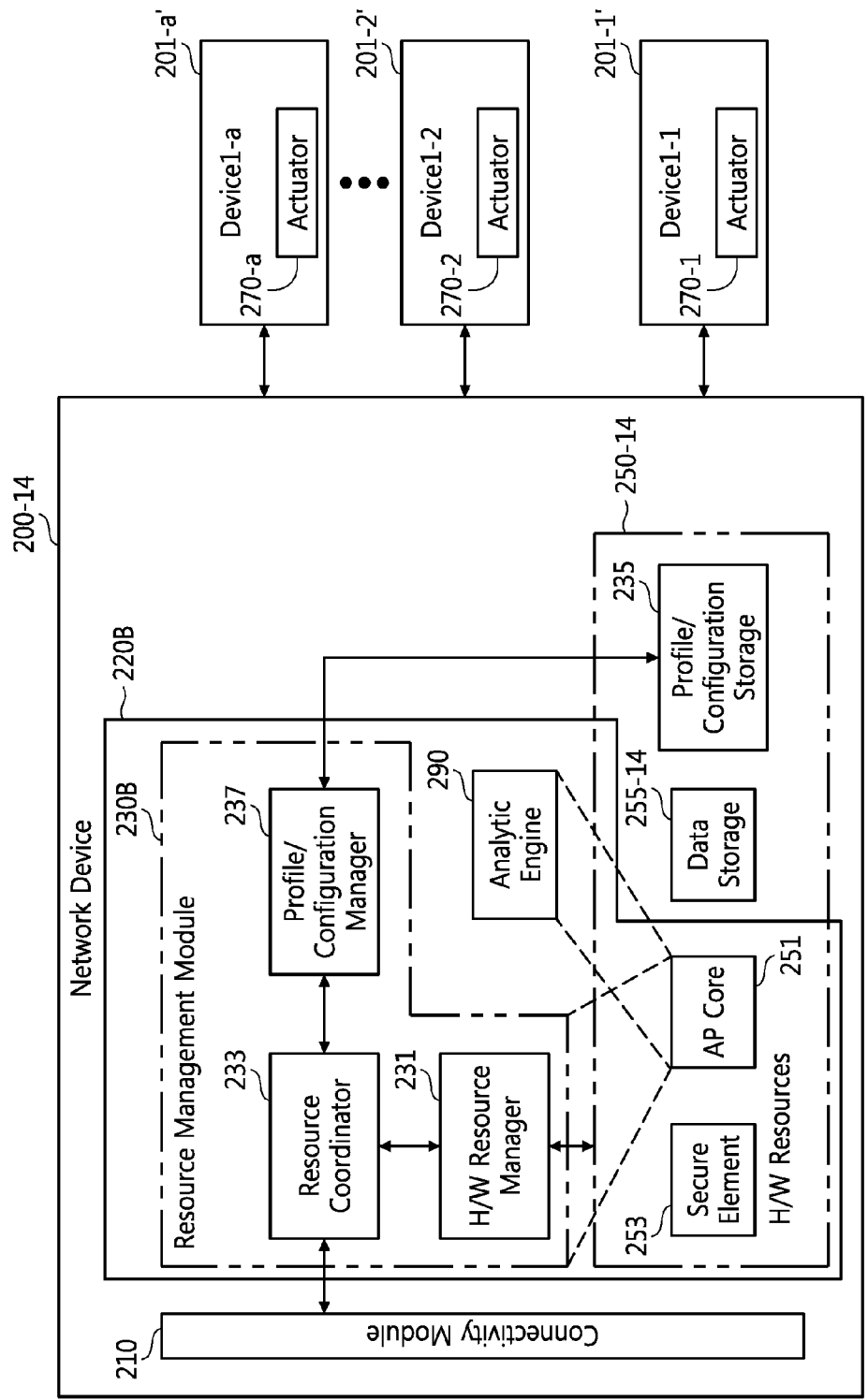

FIGS. 1A through 1N are block diagrams of network devices 200-1 through 200-14 (collectively denoted by numeral 200) according to some exemplary embodiments of the inventive concept. Referring to FIG. 1A, the network device 200-1 may include a connectivity module 210, a resource management module 230A, hardware resources 250-1, and one or more actuators 270-1 through 270-$a$ (where "a" is a natural number of at least 3). The resource management module 230A and an analytic engine 290 may be implemented in one or more hardware modules including a processor configured to execute functions and operations of the resource management module 230A described in reference to FIGS. 1A through 1N. These functions and operations may be implemented as computer instructions stored in a memory (not shown) included in or connected to the resource management module 230A.

The connectivity module 210 may search for any accessible network device(s) through wireless communication (e.g., Wi-Fi or Bluetooth) and may control communication of software resources of the network device 200-1 with any network device(s) connected with the network device 200-1. For example, the software resources may include profile/configuration information (hereinafter, referred to as "profile/configuration") which will be described with reference to FIG. 2, software engine, and/or data, but the inventive concept is not restricted these examples.

A system on chip (SoC) 220A may include a resource management module 230A and an AP core 251. Although the SoC 220A includes the resource management module 230A and the AP core 251 in the embodiments illustrated in FIG. 1A, the SoC 220A may also include the connectivity module 210 and/or the actuators 270-1 through 270-a in other exemplary embodiments.

The SoC 220A may be an integrated circuit (IC), a motherboard, an application processor (AP), a mobile AP, or a chip set. The AP core 251 may be a central processing unit (CPU) or processor which includes at least one core. The AP core 251 may be a computing logic circuit that executes a software engine and processes data.

The resource management module 230A may monitor a current state of the hardware resources 250-1. The resource management module 230A also manage sharing conditions of the hardware resources 250-1 to be shared by the network device 200-1 with at least one another network device and shared information about a hardware resource currently shared by the network device 200-1 with at least one another network device. The sharing conditions and the shared information may include profile/configuration which will be described with reference to FIG. 2.

In detail, the resource management module 230A may monitor a current state of the hardware resources 250-1 included in (or connected to) the network device 200-1, a profile of sharing conditions, and a configuration of shared information. The resource management module 230A may include a hardware resource manager 231, a resource coordinator 233, and a profile/configuration manager 237.

The hardware resource manager 231 may monitor and analyze the current state of the hardware resources 250-1 included in (or connected to) the network device 200-1. When the AP core 251 is a CPU, the current state may include at least one among CPU utilization, CPU usage, CPU occupancy, and CPU workload. The hardware resource manager 231 may also monitor an available memory capacity of a data storage 255-1 as the current state of the hardware resources 250-1. According to an exemplary embodiment, the hardware resource manager 231 may also monitor and analyze a current state of software resources such as the profile/configuration, the analytic engine 290, etc. Thus, the hardware resource manger 231 may be termed a resource manager.

The resource coordinator 233 may control the hardware resource manager 231 and the profile/configuration manager 237. For example, the resource coordinator 233 may communicate a command and/or data with the hardware resource manager 231 and the profile/configuration manager 237.

For example, the resource coordinator 233 may provide the current state of the hardware resource 250-1 in real time (or on-the-fly) to at least one network device connected to the network device 200-1 through the connectivity module 210. For example, the resource coordinator 233 may manage sharing of hardware resource(s) with at least one network device to be connected or have been connected to the network device 200-1. The hardware resources shared or to be shared may include at least one resource among the AP core 251, data storage 255-1, a secure element 253-1 and the analytic engine 290 included in the network device 200-1, and one or more devices 201-1 through 201-a connected to the network device 2001.

The profile/configuration manager 237 may manage transmission and/or update of profile/configuration. In detail, the profile/configuration manager 237 may read the profile/configuration from a profile/configuration storage 235, and transmit the profile/configuration to the resource coordinator 233 according to a control of the resource coordinator 233. The resource coordinator 233 may transmit the profile/configuration received from the profile/configuration manager 237 to at least one another network device to be connected or have been connected to the network device 200-1 through the connectivity module 210.

When profile/configuration of another network device is input to the network device 200-1, the resource coordinator 233 transmits the profile/configuration received through the connectivity module 210 to the profile/configuration manager 237. The profile/configuration manager 237 may store the profile/configuration of the other network device in the profile/configuration storage 235. In other words, the profile/configuration storage 235 may store the profile/configuration of the other network device as well as the profile/configuration of the network device 200-1.

When another network device is connected to the network device 2001, the profile/configuration manager 237 may update the profile/configuration of the network device 200-1 and/or the profile/configuration of the other network device. When software resources and/or hardware resources shared or to be shared are added or changed, the profile/configuration manager 237 may update the profile/configuration of the network device 200-1 and/or the profile/configuration of the other network device.

The hardware resources 250-1 may include the AP core 251, the secure element 253-1, and the data storage 255-1. The AP core 251 may control the connectivity module 210, the resource management module 230A, the hardware resources 250-1, and the actuators 270-1 through 270-a.

The AP core 251 may control the overall operation of the network device 200-1. The AP core 251 may execute applications that provide Internet browsers, games, or moving pictures. The AP core 251 may have a single core or multi-core architecture. The multi-core architecture may be dual-core, triple-core, quad-core, hexa-core, octa-core, or magni-core, but the inventive concept is not restricted to the number of cores included in the AP core 251. When the AP core 251 has a multi-core structure, at least one core among multiple cores may be assigned as a hardware resource to be shared with another network device according to a sharing policy managed by the AP core 251 or the resource coordinator 233. The multiple cores may have different performance and power consumption, respectively.

The AP core 251 may include the analytic engine 290. The analytic engine 290 may receive and analyze an event detected by one or more devices 201-1 through 201-a. The analytic engine 290 may also analyze data transmitted from at least one another network device, and may transmit an analysis result to the resource management module 230A.

The secure element 253-1 may include a processor (not shown) which controls operations of the secure element 253-1 and the profile/configuration storage 235 which stores profile/configuration. This processor and the profile/configuration storage 235 may be formed together in a single package, and an internal bus connecting the processor and the profile/configuration storage 235 may be formed within the package. The secure element 253-1, e.g., the processor, may have a function of defending against an external attack, e.g., a lab attack. Accordingly, the secure element 253-1 may safely store security data relevant to the profile/configuration stored in the profile/configuration storage 235. The secure element 253-1 may also store security data for the AP core 251. For example, the profile/configuration and the security data for the AP core 251 may be stored in the profile/configuration storage 235.

For example, the secure element 253-1 and the AP core 251 may generate a session key through mutual authentication. As a result, a security level of the network device 200-1 may be increased or enhanced. For example, the secure element 253-1 and the AP core 251 may be formed together in a single package. For example, the secure element 253-1 may be implemented as a subscriber identity module (SIM), a user identity module (UIM), or a universal SIM (USIM), but the inventive concept is not restricted to these examples.

The data storage 255-1 may store data needed by the AP core 251 or the analytic engine 290 or data generated by the AP core 251 or the analytic engine 290. The data stored in the data storage 255-1 may be data that has been sensed by one or more devices 201-1 through 201-a.

The data storage 255-1 may be formed using a volatile memory and/or a non-volatile memory. Although one data storage 255-1 is illustrated in FIG. 1A, the data storage 255-1 may refer to a group of data storages including one or more volatile memories and/or non-volatile memories.

The data storage 255-1 may store a boot image for booting the network device 200-1. The data storage 255-1 may be implemented as a non-volatile memory device such as a flash memory device, a solid state drive or solid state disk (SSD), a universal flash storage (UFS), or a hard disk drive (HDD), but the inventive concept is not restricted to these examples.

The data storage 255-1 may store data needed for the operation of the network device 200-1 or data generated by the network device 200-1. The data storage 255-1 may be implemented as a volatile memory device such as random access memory (RAM), dynamic RAM (DRAM), or static RAM (SRAM), but the inventive concept is not restricted to these examples.

The actuators 270-1 through 270-a may control the devices 201-1 through 201-a, respectively, according to the AP core 251 or the resource management module 230A. Although the actuators 270-1 through 270-a are included in the network device 200-1 in the embodiments illustrated in FIG. 1A, the actuators 270-1 through 270-a may be included in devices 201-1' through 201-a', respectively, as shown in FIG. 1D.

As described above, each of the devices 201-1 through 201-a may be implemented as a sink node, a hub, a gateway, an IoT device, an IoE device, or a sensor node. For example, one of the devices 201-1 through 201-a may be implemented as a sensor such as an image sensor, a bio sensor detecting biometric information, an acoustic sensor, a sound sensor, a vibration sensor, a sensor relevant to automotive and transportation, a sensor relevant to chemicals, a sensor relevant to environment, weather, moisture or humidity, a sensor relevant to flow or fluid velocity, or a sensor relevant to navigation instruments.

Referring to FIG. 1B, a network device 200-2 may include the connectivity module 210, the resource management module 230A, hardware resources 250-2, and the actuators 270-1 through 270-a. The structure and functions of the network device 200-2 illustrated in FIG. 1B are the same as or similar to those of the network device 200-1 illustrated in FIG. 1A, except for the fact that a data storage 255-2 includes the profile/configuration storage 235 that stores profile/configuration.

A secure element 253-2 may include a processor (not shown) that controls operations of the secure element 253-2 and a storage (not shown) that stores security data. The secure element 253-2 may control an access operation, such as a write operation or a read operation, on the profile/configuration storage 235.

In detail, when the profile/configuration manager 237 accesses the profile/configuration storage 235, the secure element 253-2 may control an access to the profile/configuration storage 235. Accordingly, when the access to the profile/configuration storage 235 is permitted by the secure element 253-2, the profile/configuration manager 237 is allowed to read or update profile/configuration of the network device 200-2 and/or profile/configuration of another network device stored in the profile/configuration storage 235.

Therefore, the secure element 253-2 may safely manage the profile/configuration stored in the profile/configuration storage 235. The secure element 253-2 may include a storage (not shown) that stores security data for the AP core 251. The secure element 253-2 may be implemented as a SIM, a UIM, or a USIM, but the inventive concept is not restricted to these examples.

The data storage 255-2 may store data needed by the AP core 251 or the analytic engine 290 or data generated by the AP core 251 or the analytic engine 290. Data sensed by at least one of the devices 201-1 through 201-a may be stored in the data storage 255-2.

The data storage 255-2 may include the profile/configuration storage 235 that stores the profile/configuration. The profile/configuration storage 235 may refer to a non-volatile memory device or a portion of a memory area included in the non-volatile memory device. The data storage 255-2 may store a boot image for booting the network device 200-2. The data storage 255-2 may be implemented as a non-volatile memory device such as a flash memory device, an SSD, a UFS, or an HDD, but the inventive concept is not restricted to these examples.

Referring to FIG. 1C, a network device 200-3 may include the connectivity module 210, the resource management module 230A, hardware resources 250-3, and the actuators 270-1 through 270-a. The structure and functions of the network device 200-3 illustrated in FIG. 1C are substantially the same as or similar to those of the network device 200-1 illustrated in FIG. 1A, except for a secure element 253-3 and a data storage 255-3.

When the profile/configuration manager 237 accesses the profile/configuration storage 235, the profile/configuration storage 235 may send (or transmit) an access signal to the secure element 253-3. The secure element 253-3 may determine whether to permit the profile/configuration manager 237 to access the profile/configuration storage 235 based on the access signal and a security policy, and may send (or transmit) an indicator signal corresponding to a determination result to the profile/configuration storage 235.

The secure element 253-3 may include a processor (not shown) that controls operations of the secure element 253-3 and a storage (not shown) that stores security data.

The secure element 253-3 may control an access operation, such as a write operation or a read operation, on the profile/configuration storage 235. In detail, when the profile/configuration manager 237 accesses the profile/configuration storage 235, the secure element 253-3 may control an access to the profile/configuration storage 235. Accordingly, when the access to the profile/configuration storage 235 is permitted by the secure element 253-3, the profile/configuration manager 237 is allowed to read or update profile/configuration of the network device 200-3 and/or profile/configuration of another network device stored in the profile/configuration storage 235.

Therefore, the secure element 253-3 may safely manage the profile/configuration stored in the profile/configuration storage 235. The secure element 253-3 may include a storage (not shown) that stores security data for the AP core 251. The secure element 253-3 may be implemented as a SIM, a UIM, or a USIM, but the inventive concept is not restricted to these examples.

The data storage 255-3 may store data needed by the AP core 251 or the analytic engine 290 or data generated by the AP core 251 or the analytic engine 290. Data sensed by at least one of the devices 201-1 through 201-a may be stored in the data storage 255-3.

The data storage 255-3 may include the profile/configuration storage 235 that stores the profile/configuration. The profile/configuration storage 235 may refer to a non-volatile memory device or a portion of a memory area included in the non-volatile memory device.

Referring to FIG. 1D, a network device 200-4 may include the connectivity module 210, the resource management module 230A, and hardware resources 250-4. Referring to FIGS. 1A and 1D, devices 201-1' through 201-a' may include the actuators 270-1 through 270-a, respectively. As described above, each of the devices 201-1' through 201-a' may be implemented as a sink node, a hub, a gateway, an IoT device, an IoE device, or a sensor node.

The structure and functions of a secure element 253-4 illustrated in FIG. 1D are substantially the same as or similar to those of the secure element 253-1 illustrated in FIG. 1A. The structure and functions of a data storage 255-4 illustrated in FIG. 1D are substantially the same as or similar to those of the data storage 255-1 illustrated in FIG. 1A. Here, "being substantially the same as" means being completely the same as physically or being the same as within the margin of error.

Referring to FIG. 1E, a network device 200-5 may include the connectivity module 210, the resource management module 230A, and hardware resources 250-5. Referring to FIGS. 1B and 1E, the devices 201-1' through 201-a' may include the actuators 270-1 through 270-a, respectively.

The structure and functions of a secure element 253-5 illustrated in FIG. 1E are substantially the same as or similar to those of the secure element 253-2 illustrated in FIG. 1B. The structure and functions of a data storage 255-5 illustrated in FIG. 1E are substantially the same as or similar to those of the data storage 255-2 illustrated in FIG. 1B.

Referring to FIG. 1F, a network device 200-6 may include the connectivity module 210, the resource management module 230A, and hardware resources 250-6. Referring to FIGS. 1C and 1F, the devices 201-1' through 201-a' may include the actuators 270-1 through 270-a, respectively.

The structure and functions of a secure element 253-6 illustrated in FIG. 1F are substantially the same as or similar to those of the secure element 253-3 illustrated in FIG. 1C. The structure and functions of a data storage 255-6 illustrated in FIG. 1F are substantially the same as or similar to those of the data storage 255-3 illustrated in FIG. 1C.

Referring to FIG. 1G, a network device 200-7 may include the connectivity module 210, a resource management module 230B, hardware resources 250-7, and the actuators 270-1 through 270-a. The resource management module 230B, a secure element 253, and the analytic engine 290 may be implemented in software (or as software components) that can be executed in an AP core 251. The resource management module 230B may be stored in a data storage 255-7, and may be executed by the AP core 251.

The hardware resources 250-7 may include the AP core 251, the profile/configuration storage 235, and the data storage 255-7. Although the data storage 255-7 is provided outside the AP core 251 in the embodiments illustrated in FIG. 1G, the data storage 255-7 may be implemented as a memory device (not shown) existing within the AP core 251.

The secure element 253 executed by the AP core 251 may control an access operation, such as a write operation or a read operation, on the profile/configuration storage 235. In detail, when the profile/configuration manager 237 accesses the profile/configuration storage 235, the secure element 253 may control an access to the profile/configuration storage 235. Accordingly, when the access to the profile/configuration storage 235 is permitted by the secure element 253, the profile/configuration manager 237 is allowed to read or update profile/configuration of the network device 200-7 and/or profile/configuration of another network device.

The functions of the software components 231, 233, 237, 253, and 290 illustrated in FIG. 1G are substantially the same as or similar to those of the hardware components 231, 233, 237, 253-1, and 290 illustrated in FIG. 1A. The structure and functions of the data storage 255-7 illustrated in FIG. 1G are substantially the same as or similar to those of the data storage 255-1 illustrated in FIG. 1A.

Referring to FIG. 1H, a network device 200-8 may include the connectivity module 210, the resource management module 230B, hardware resources 250-8, and the actuators 270-1 through 270-a. The resource management module 230B, a secure element 253, and the analytic engine 290 may be implemented in software (or as software components) that can be executed in the AP core 251. A data storage 255-8 may include the profile/configuration storage 235.

The secure element 253 executed by the AP core 251 may control an access operation, such as a write operation or a read operation, on the profile/configuration storage 235. In detail, when the profile/configuration manager 237 accesses the profile/configuration storage 235, the secure element 253 may control an access to the profile/configuration storage 235. Accordingly, when the access to the profile/configuration storage 235 is permitted by the secure element 253, the profile/configuration manager 237 is allowed to read or update profile/configuration of the network device 200-8 and/or profile/configuration of another network device.

The structure and functions of the data storage 255-8 illustrated in FIG. 1H are substantially the same as or similar to those of the data storage 255-2 illustrated in FIG. 1B. The functions of the software components 231, 233, 237, 253, and 290 illustrated in FIG. 1H are substantially the same as or similar to those of the hardware components 231, 233, 237, 253-1, and 290 illustrated in FIG. 1A.

Referring to FIG. 1I, the network device 200-9 may include the connectivity module 210, the resource management module 230B, and hardware resources 250-9. Referring to FIGS. 1G and 1I, the devices 201-1' through 201-a' may include the actuators 270-1 through 270-a, respectively. The resource management module 230B or the AP core 251 may control the actuators 270-1 through 270-a. The hardware resources 250-9 may include the AP core 251, the profile/configuration storage 235, and a data storage 255-9.

The functions of the software components 231, 233, 237, 253, and 290 illustrated in FIG. 1I are substantially the same as or similar to those of the hardware components 231, 233, 237, 253-1, and 290 illustrated in FIG. 1A. The structure and functions of the data storage 255-9 illustrated in FIG. 1I are substantially the same as or similar to those of the data storage 255-1 illustrated in FIG. 1A.

Referring to FIG. 1J, a network device 200-10 may include the connectivity module 210, the resource management module 230B, and hardware resources 250-10. Referring to FIGS. 1H and 1J, the devices 201-1' through 201-a' may include the actuators 270-1 through 270-a, respectively. The resource management module 230B or the AP core 251 may control the actuators 270-1 through 270-a. The functions of the software components 231, 233, 237, 253, and 290 illustrated in FIG. 1J are substantially the same as or similar to those of the hardware components 231, 233, 237, 253-1, and 290 illustrated in FIG. 1A.

An SoC 220B illustrated in FIGS. 1G through 1J may include the AP core 251.

Referring to FIG. 1K, a network device 200-11 may include the connectivity module 210, the resource management module 230A, hardware resources 250-11, the actuators 270-1 through 270-a, and the analytic engine 290. The SoC 220A may include the resource management module 230A, the AP core 251, the secure element 253, and the analytic engine 290.

While the AP core 251 includes the analytic engine 290 and the secure element 253-1 includes a profile/configuration storage 235 in the embodiments illustrated in FIG. 1A, the AP core 251 does not include the analytic engine 290 and the secure element 253 does not include the profile/configuration storage 235 in the embodiments illustrated in FIG. 1K.

The functions of the secure element 253 illustrated in FIG. 1K are substantially the same as or similar to those of the secure element 253-1 illustrated in FIG. 1A. The functions of the analytic engine 290 illustrated in FIG. 1K are substantially the same as or similar to those of the analytic engine 290 illustrated in FIG. 1A. The structure and functions of a data storage 255-11 illustrated in FIG. 1K are substantially the same as or similar to those of the data storage 255-1 illustrated in FIG. 1A.

Referring to FIG. 1L, a network device 200-12 may include the connectivity module 210, the resource management module 230A, and hardware resources 250-12. Referring to FIGS. 1K and 1L, the devices 201-1' through 201-a' may include the actuators 270-1 through 270-a, respectively. The resource management module 230A or the AP core 251 may control the actuators 270-1 through 270-a.

Referring to FIG. 1M, a network device 200-13 may include the connectivity module 210, the resource management module 230B, hardware resources 250-13, and the actuators 270-1 through 270-a. The resource management module 230B and the analytic engine 290 may be implemented in software (or as software components) that can be executed in the AP core 251. The hardware resources 250-13 may include the AP core 251, the secure element 253, the profile/configuration storage 235, and a data storage 255-13.

The SoC 220B may include the AP core 251 and the secure element 253. Referring to FIGS. 1A through 1N, hardware and software components having like names may perform the same or similar functions.

Referring to FIG. 1N, a network device 200-14 may include the connectivity module 210, the resource management module 230B, and hardware resources 250-14. Referring to FIGS. 1M and 1N, the devices 201-1' through 201-a' may include the actuators 270-1 through 270-a, respectively. The resource management module 230B or the AP core 251 may control the actuators 270-1 through 270-a. The hardware resources 250-14 may include the AP core 251, the secure element 253, the profile/configuration storage 235, and a data storage 255-14.

In the network devices 200-1 through 200-14 described with reference to FIGS. 1A through 1N, at least one element among the resource management module, the secure element, and the analytic engine may be implemented in hardware or software. The profile/configuration storage 235 may or may not be included in a hardware secure element. The actuators 270-1 through 270-a may or may not be included in each of the network devices 200-1 through 200-14 and may or may not be included in the devices 201-1 through 201-a.

Figure 2:
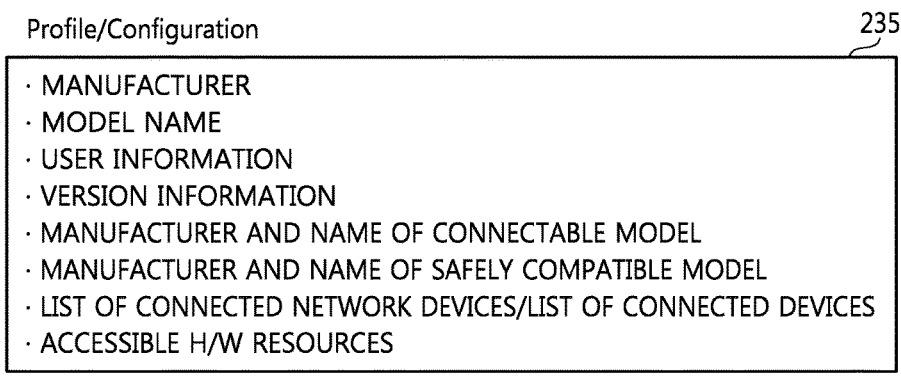
FIG. 2 is a diagram of profile/configuration stored in a profile/configuration storage included in the network devices illustrated in FIGS. 1A through 1N according to some exemplary embodiments of the inventive concept.

FIG. 2 is a diagram of profile/configuration stored in the profile/configuration storage 235 included in the network device 200 illustrated in FIGS. 1A through 1N according to some exemplary embodiments of the inventive concept. Referring to FIGS. 1A through 2, the profile/configuration may include sharing conditions and shared information. In detail, the profile/configuration may include a manufacturer of the network device 200, a model name, user information, version information, a manufacturer and name of a connectable model, a manufacturer and name of a safely compatible model, a list of connected network devices and/or a list of connected devices, and accessible hardware resources, but the profile/configuration stored in the profile/configuration storage 235 is not restricted to these examples.

At least one among the manufacturer, the model name, the user information, the version information, the manufacturer and name of a connectable model, and the manufacturer and name of a safely compatible model may be a sharing condition. At least one among the list of connected network devices and/or the list of connected devices and the accessible hardware resources may be shared information. The profile/configuration may include profile/configuration of at least one another network device as well as the profile/configuration of the network device 200.

Figure 3:
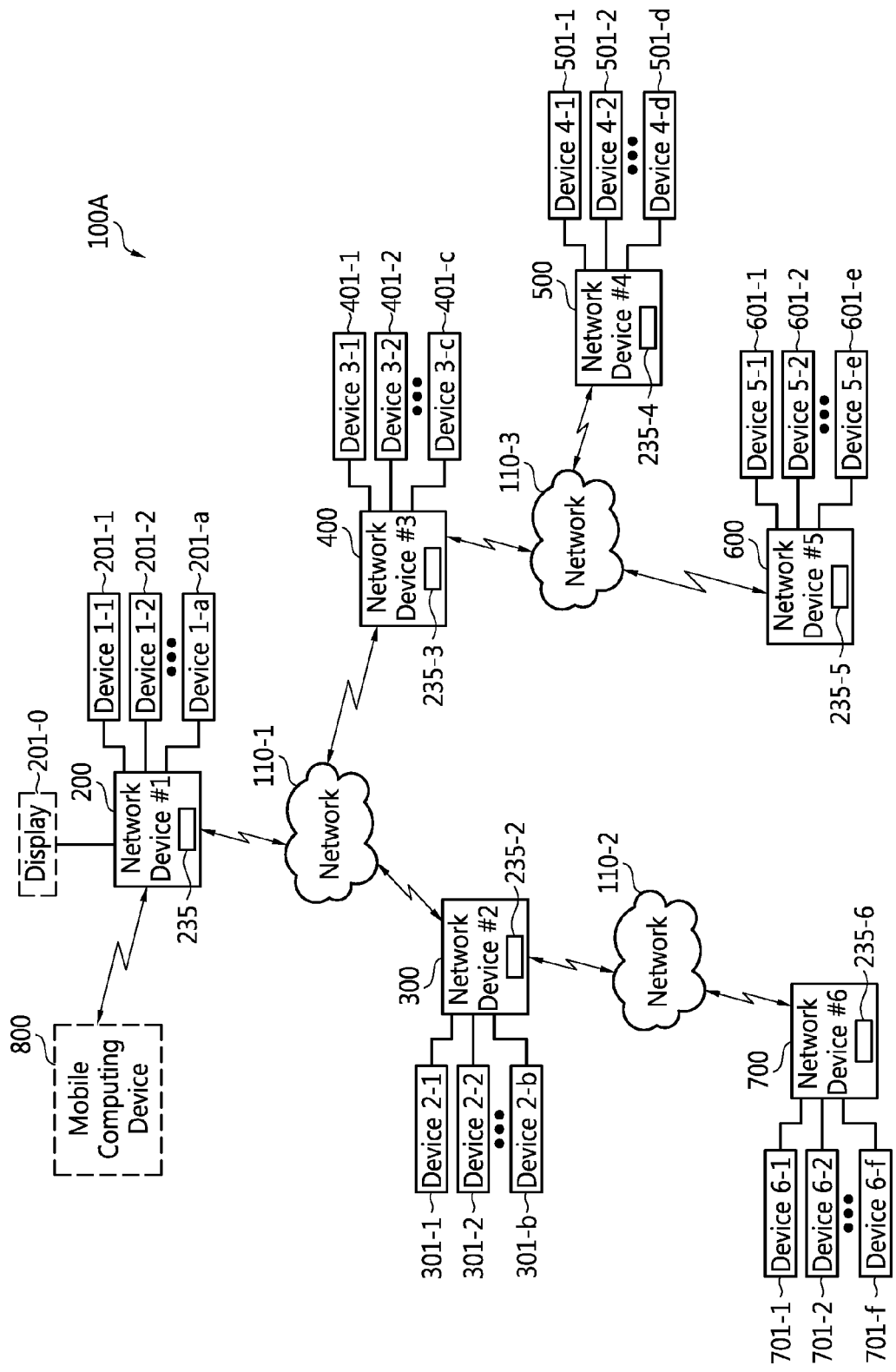
FIG. 3 is a diagram of a network system including network devices according to some exemplary embodiments of the inventive concept.

FIG. 3 is a diagram of a network system 100A including network devices 200, 300, 400, 500, 600, and 700 according to some exemplary embodiments of the inventive concept. Referring to FIGS. 1A through 3, the network system 100A may include the network devices 200, 300, 400, 500, 600, and 700 having different hardware resources.

Referring to FIG. 3, a second network device 300 is connected with a third network device 400 through a first network 110-1 and is connected with a sixth network device 700 through a second network 110-2, a third network device 400 is connected with a fourth and fifth network devices 500 and 600 through a third network 110-3, and a first network device 200 is a new network device that requests an access to the network system 100A. It is also assumed that each of the network devices 200, 300, 400, 500, 600, and 700 has the structure of one of the network devices 200-1 through 200-14 described with reference to FIGS. 1A through 1N, and may be connected with or may communicate with at least one device. For instance, the first network device 200 may be connected with the devices 201-1 through 201-a or may communicate with the devices 201-1 through 201-a via a wired or wireless connection. As described with reference to FIGS. 1A through 1N, each of the devices 201-1 through 201-a may or may not include an actuator. The first network device 200 includes the first profile/configuration storage 235. The first profile/configuration storage 235 may store profile/configuration of the first network device 200 and profile/configuration of at least one another network device as well.

The first network device 200 may communicate commands and/or data with a mobile computing device 800 through the connectivity module 210. The mobile computing device 800 may be implemented as a laptop computer, a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an IoT device, an IoE device, a drone, or an e-book.

The first network device 200 may receive and transmit commands and/or data through an input/output interface 201-0. The input/output interface 201-0 may include an input device (such as a touch pad, a keypad, or an input button) and an output device (such as a display or a speaker).

Since each of the network devices 200, 300, 400, 500, 600, and 700 has one of the structures 200-1 through 200-14 described with reference to FIGS. 1A through 1N, it may communicate commands and/or data with the mobile computing device 800 through the connectivity module 210. Although an input/output interface for each of the network devices 300, 400, 500, 600, and 700 is not illustrated in FIG. 3, the network devices 300, 400, 500, 600, and 700 may include an input/output interface the same as or similar to the input/output interface 201-0.

The second network device 300 may be connected with devices 301-1 through 301-$b$ or may communicate with the devices 301-1 through 301-$b$ via a wired or wireless connection. As described with reference to FIGS. 1A through 1N, each of the devices 301-1 through 301-$b$ may or may not include an actuator. The second network device 300 includes a second profile/configuration storage 235-2. The second profile/configuration storage 235-2 may store profile/configuration of the second network device 300 and profile/configuration of at least one another network device as well.

The third network device 400 may be connected with devices 401-1 through 401-$c$ or may communicate with the devices 401-1 through 401-$c$ via a wired or wireless connection. As described with reference to FIGS. 1A through 1N, each of the devices 401-1 through 401-$c$ may or may not include an actuator. The third network device 400 includes a third profile/configuration storage 235-3. The third profile/configuration storage 235-3 may store profile/configuration of the third network device 400 and profile/configuration of at least one another network device as well.

The fourth network device 500 may be connected with devices 501-1 through 501-$d$ or may communicate with the devices 501-1 through 501-$d$ via a wired or wireless connection. As described with reference to FIGS. 1A through 1N, each of the devices 501-1 through 501-$d$ may or may not include an actuator. The fourth network device 500 includes a fourth profile/configuration storage 235-4. The fourth profile/configuration storage 235-4 may store profile/configuration of the fourth network device 500 and profile/configuration of at least one another network device as well.

The fifth network device 600 may be connected with devices 601-1 through 601-$e$ or may communicate with the devices 601-1 through 601-$e$ via a wired or wireless connection. As described with reference to FIGS. 1A through 1N, each of the devices 601-1 through 601-$e$ may or may not include an actuator. The fifth network device 600 includes a fifth profile/configuration storage 235-5. The fifth profile/configuration storage 235-5 may store profile/configuration of the fifth network device 600 and profile/configuration of at least one another network device as well.

The sixth network device 700 may be connected with devices 701-1 through 701-$f$ or may communicate with the devices 701-1 through 701-$f$ via a wired or wireless connection. As described with reference to FIGS. 1A through 1N, each of the devices 701-1 through 701-$f$ may or may not include an actuator. The sixth network device 700 includes a sixth profile/configuration storage 235-6. The sixth profile/configuration storage 235-6 may store profile/configuration of the sixth network device 700 and profile/configuration of at least one another network device as well.

Each of the networks 110-1, 110-2, and 110-3 may be LAN, WLAN like WiFi, WPAN like Bluetooth, wireless USB, Zigbee, NFC, RFID, or mobile cellular network but is not restricted thereto.

FIG. 4 is a diagram of the profile/configuration stored in the profile/configuration storage 235-2 included in the second network device 300 illustrated in FIG. 3. Referring to FIGS. 3 and 4, the second profile/configuration storage 235-2 may store the profile/configuration of one or more other network devices as well as the profile/configuration of the second network device 300. FIG. 4 shows an example of profile/configuration, i.e., shared information PCI1.

Referring to FIG. 4, from the view point of the second network device 300, the second network device 300 may have shared or will share an AP core AP Core2, a data storage Data Storage2, and a device Device2-1 among its hardware resources. The second network device 300 may use, as shared hardware resources, an AP core AP Core3, a data storage Data Storage3, and devices Device3-1 through Device3-$c$ among hardware resources of the third network device 400.

The second network device 300 may use, as shared hardware resources, an AP core AP Core4, a data storage Data Storage4, and devices Device4-1 and Device4-2 among hardware resources of the fourth network device 500 through the third network device 400. The second network device 300 may use, as shared hardware resources, an AP core AP Core5 and devices Device5-1 and Device5-$e$ among hardware resources of the fifth network device 600 through the third network device 400. The second network device 300 may use, as shared hardware resources, an AP core AP Core6 and devices Device6-2 and Device6-$f$ among hardware resources of the sixth network device 700.

FIG. 5 is a diagram of profile/configuration stored in the profile/configuration storage 235-3 included in the third network device 400 illustrated in FIG. 3. Referring to FIGS. 3 and 5, the third profile/configuration storage 235-3 may store the profile/configuration of one or more other network devices as well as the profile/configuration of the third network device 400. FIG. 5 shows an example of profile/configuration, i.e., shared information PCI2.

Referring to FIG. 5, from the view point of the third network device 400, the third network device 400 may have shared or will share an AP core AP Core3, a data storage Data Storage3, and devices Device3-1 and Device3-2 among its hardware resources. The third network device 400 may use, as shared hardware resources, an AP core AP Core2, a data storage Data Storage2, and devices Device2-1, Device2-2, and Device2-$b$ among hardware resources of the second network device 300.

The third network device 400 may use, as shared hardware resources, a device Device6-2 among hardware resources of the sixth network device 700 through the second network device 300. The third network device 400 may use, as shared hardware resources, an AP core AP Core4, a secure element, and devices Device4-1 and Device4-2 among hardware resources of the fourth network device 500. The third network device 400 may use, as shared hardware resources, a data storage Data Storage5 and devices Device5-1 and Device5-$e$ among hardware resources of the fifth network device 600.

Figure 6:
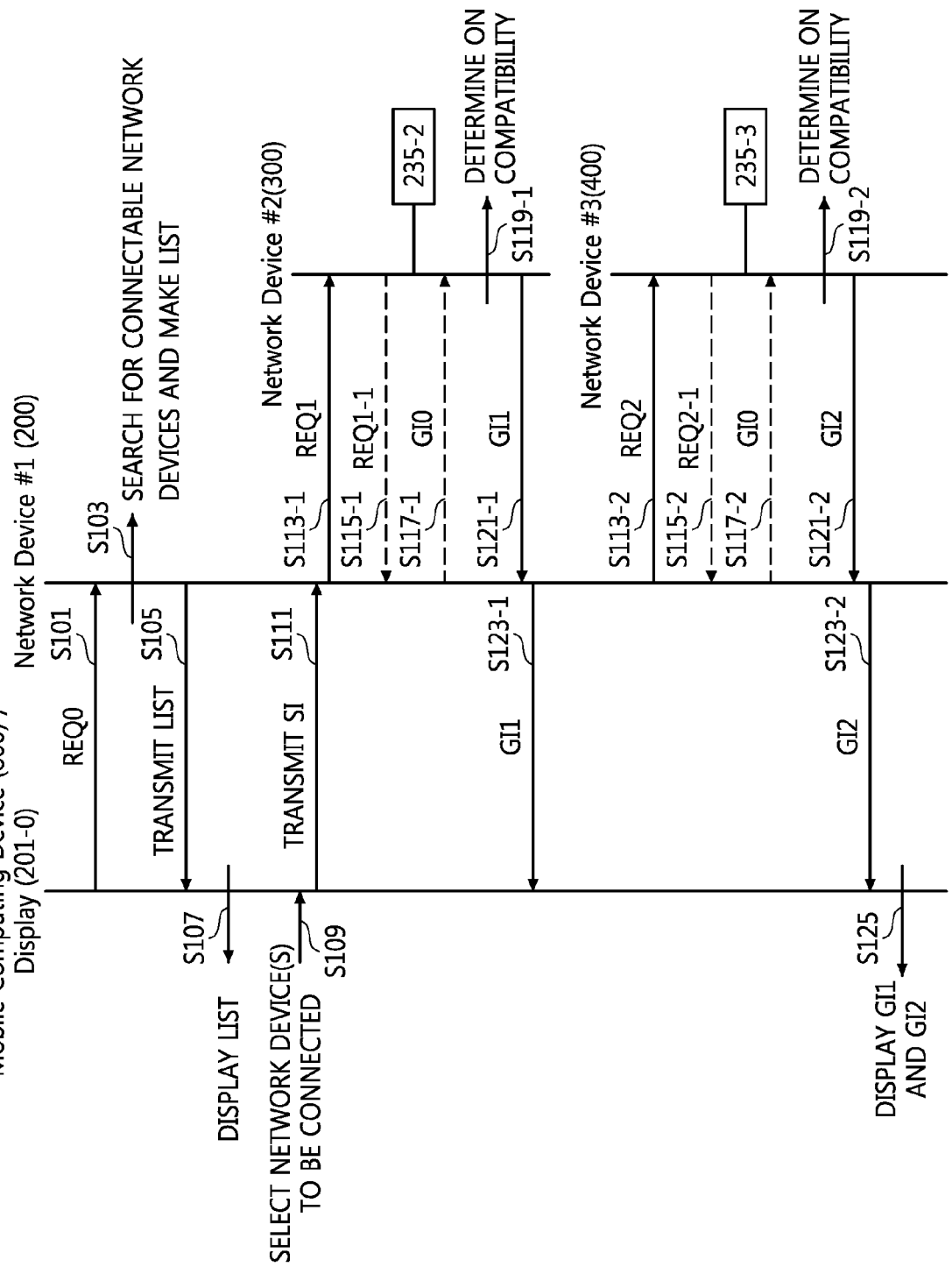
FIG. 6 is a data flow diagram for explaining the operation of the network system illustrated in FIG. 3 according to some embodiments of the inventive concept, according to some exemplary embodiments of the inventive concept.

FIG. 6 is a data flow diagram for explaining operations of the network system 100A illustrated in FIG. 3 according to some exemplary embodiments of the inventive concept. A procedure in which the new network device 200 is connected to the second network device 300 and/or the third network device 400 will be described with reference to FIGS. 1A through 6.

A user may register in the new network device 200, i.e., the first network device 200, using the mobile computing device 800 or the input/output interface 201-0 connected to the first network device 200. When registering user information in the first network device 200 using the mobile computing device 800, the user may access the first network device 200 using Bluetooth or Wi-Fi of the mobile computing device 800 and then register the user information in the first network device 200. When registering the user information using the input/output interface 201-0 connected to the first network device 200, the user may register the user information in the first network device 200 using the input/output interface 201-0. The connectivity module 210 may be connected with the mobile computing device 800 or the input/output interface 201-0 in a wired or wireless manner, and therefore, the resource management module 230A or 230B may store the user information, which has been provided from the user through the mobile computing device 800 or the input/output interface 201-0, in the profile/configuration storage 235.

As described above, the user information may be stored in the profile/configuration storage 235 according to the control of a hardware secure element or a software secure element. The user information may include a password and/or bio-information. The bio-information may be finger print information, iris information, or voice information, but is not restricted to these examples. The mobile computing device 800 or the input/output interface 201-0 may provide the user with a user interface allowing the user to input the user information. The user information may be registered in the first network device 200 through the above-described procedure.

After the registration of the user information, the mobile computing device 800 or the input/output interface 201-0 may transmit a search request REQ0 input by the user to the first network device 200 in operation S101. The connectivity module 210 may searches for connectable network devices in response to the search request REQ0 and transmit the search result to the resource management module 230A or 230B, and the resource management module 230A or 230B may create a list of the connectable network devices based on the search result in operation S103. The resource management module 230A or 230B may transmit the list of the connectable network devices to the connectivity module 210, and the connectivity module 210 may transmit the list of the connectable network devices to the mobile computing device 800 or the input/output interface 201-0 in operation S105.

Figure 7:
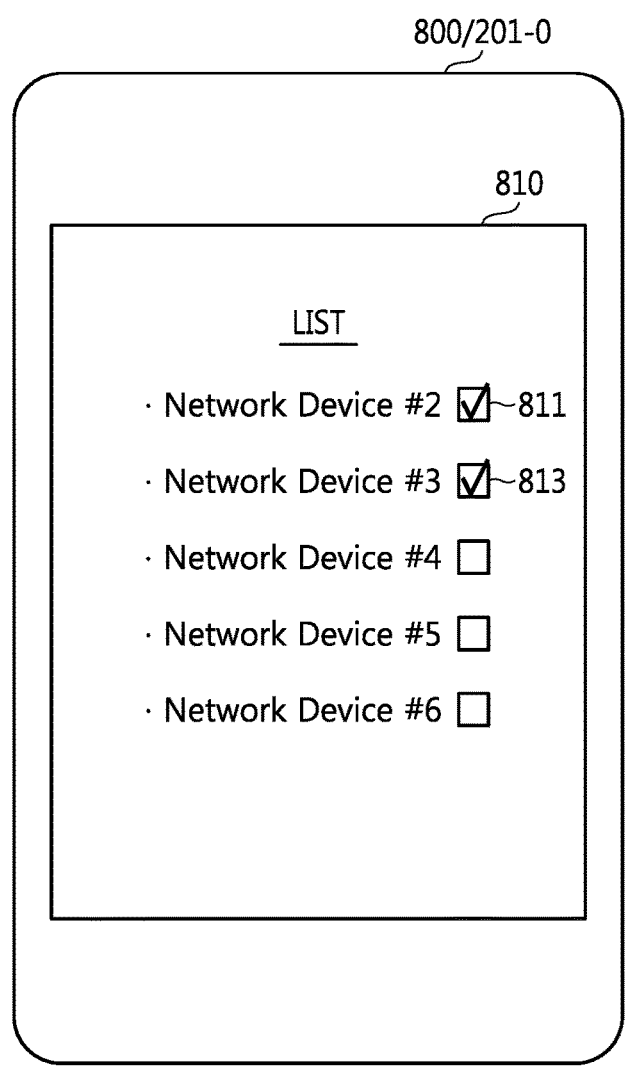
FIG. 7 is a conceptual diagram for explaining a procedure for selecting at least one network device to be connected in the data flow illustrated in FIG. 6, according to some exemplary embodiments of the inventive concept.

FIG. 7 is a conceptual diagram for explaining a procedure for selecting at least one network device to be connected in the data flow illustrated in FIG. 6. Referring to FIG. 7, the mobile computing device 800 or the input/output interface 201-0 may include a display 810 for input and output of data. It is assumed that the display 810 includes a touch screen or a touch pad for data input.

Referring to FIGS. 6 and 7, the mobile computing device 800 or the input/output interface 201-0 may display the list of network devices connectable with the first network device 200 on the display 810, as shown in FIG. 7. It is assumed that the user selects the second and third network devices 300 and 400 to be connected with the first network device 200 in the list of network devices displayed on the display 810. Accordingly, the user may select graphical user interfaces (GUIs) 811 and 813 displayed on the display 810 in operation S109. The mobile computing device 800 or the input/output interface 201-0 may transmit selection information SI to the first network device 200 in operation S111.

The connectivity module 210 of the first network device 200 may transmit the selection information SI to the resource management module 230A or 230B. The resource management module 230A or 230B may analyze the selection information SI, generate a first request REQ1 and a second request REQ2 according to the analysis result, and transmit the first request REQ1 and the second request REQ2 to the connectivity module 210. The connectivity module 210 may transmit the first request REQ1 to a connectivity module of the second network device 300 in operation S113-1 and may transmit the second request REQ2 to a connectivity module of the third network device 400 in operation S113-2.

A resource management module of the second network device 300 may determine whether the first network device 200 is connectable or compatible with the second network device 300 based on the first request REQ1 in operation S119-1. When it is determined that the first network device 200 is connectable or compatible with the second network device 300, the resource management module of the second network device 300 may transmit second profile/configuration GI1 stored in the second profile/configuration storage 235-2 to the first network device 200 in operation S121-1.

A resource management module of the third network device 400 may determine whether the first network device 200 is connectable or compatible with the third network device 400 based on the second request REQ2 in operation S119-2. When it is determined that the first network device 200 is connectable or compatible with the third network device 400, the resource management module of the third network device 400 may transmit third profile/configuration GI2 stored in the third profile/configuration storage 235-3 to the first network device 200 in operation S121-2.

When it is necessary to tighten up access security between the first network device 200 and the second network device 300, the resource management module of the second network device 300 may transmit a third request REQ1-1 requesting profile/configuration of the first network device 200 to the resource management module 230A or 230B of the first network device 200 in response to the first request REQ1 in operation S115-1. The resource management module 230A or 230B of the first network device 200 may transmit first profile/configuration GI0 stored in its profile/configuration storage 235 to the resource management module of the second network device 300 in response to the third request REQ1-1 in operation S117-1. Operations S115-1 and S117-1 may be selectively performed according to a sharing policy. However, when the resource management module 230A or 230B of the first network device 200 does not transmit the first profile/configuration GI0 to the second network device 300, the resource management module of the second network device 300 may or may not transmit the second profile/configuration GI1 to the first network device 200 according to the sharing policy.

The resource management module of the second network device 300 may determine whether the first network device 200 is connectable or compatible with the second network device 300 based on the first profile/configuration GI0 in operation S119-1. When it is determined that the first network device 200 is connectable or compatible with the second network device 300, the resource management module of the second network device 300 may transmit the second profile/configuration GI1 stored in the second profile/configuration storage 235-2 to the first network device 200 in operation S121-1.

When it is necessary to tighten up the access security between the first network device 200 and the third network device 400, the resource management module of the third network device 400 may transmit a fourth request REQ2-1 requesting profile/configuration of the first network device 200 to the resource management module 230A or 230B of the first network device 200 in response to the second request REQ2 in operation S115-2. The resource management module 230A or 230B of the first network device 200 may transmit the first profile/configuration GI0 stored in its profile/configuration storage 235 to the resource management module of the third network device 400 in response to the fourth request REQ2-1 in operation S117-2. Operations S115-2 and S117-2 may be selectively performed according to a sharing policy. However, when the resource management module 230A or 230B of the first network device 200 does not transmit the first profile/configuration GI0 to the third network device 400, the resource management module of the third network device 400 may or may not transmit the third profile/configuration GI2 to the first network device 200 according to the sharing policy.

The resource management module of the third network device 400 may determine whether the first network device 200 is connectable or compatible with the third network device 400 based on the first profile/configuration GI0 in operation S119-2. When it is determined that the first network device 200 is connectable or compatible with the third network device 400, the resource management module of the third network device 400 may transmit the third profile/configuration GI2 stored in the third profile/configuration storage 235-3 to the first network device 200 in operation S121-2.

The first network device 200 may transmit the second profile/configuration GI1 from the second network device 300 to the mobile computing device 800 or the input/output interface 201-0 in operation S123-1. The first network device 200 may also transmit the third profile/configuration GI2 from the third network device 400 to the mobile computing device 800 or the input/output interface 201-0 in operation S123-2. The mobile computing device 800 or the input/output interface 201-0 may display the second profile/configuration GI1 and the third profile/configuration GI2 on the display 810 in operation S125.

Figure 8:
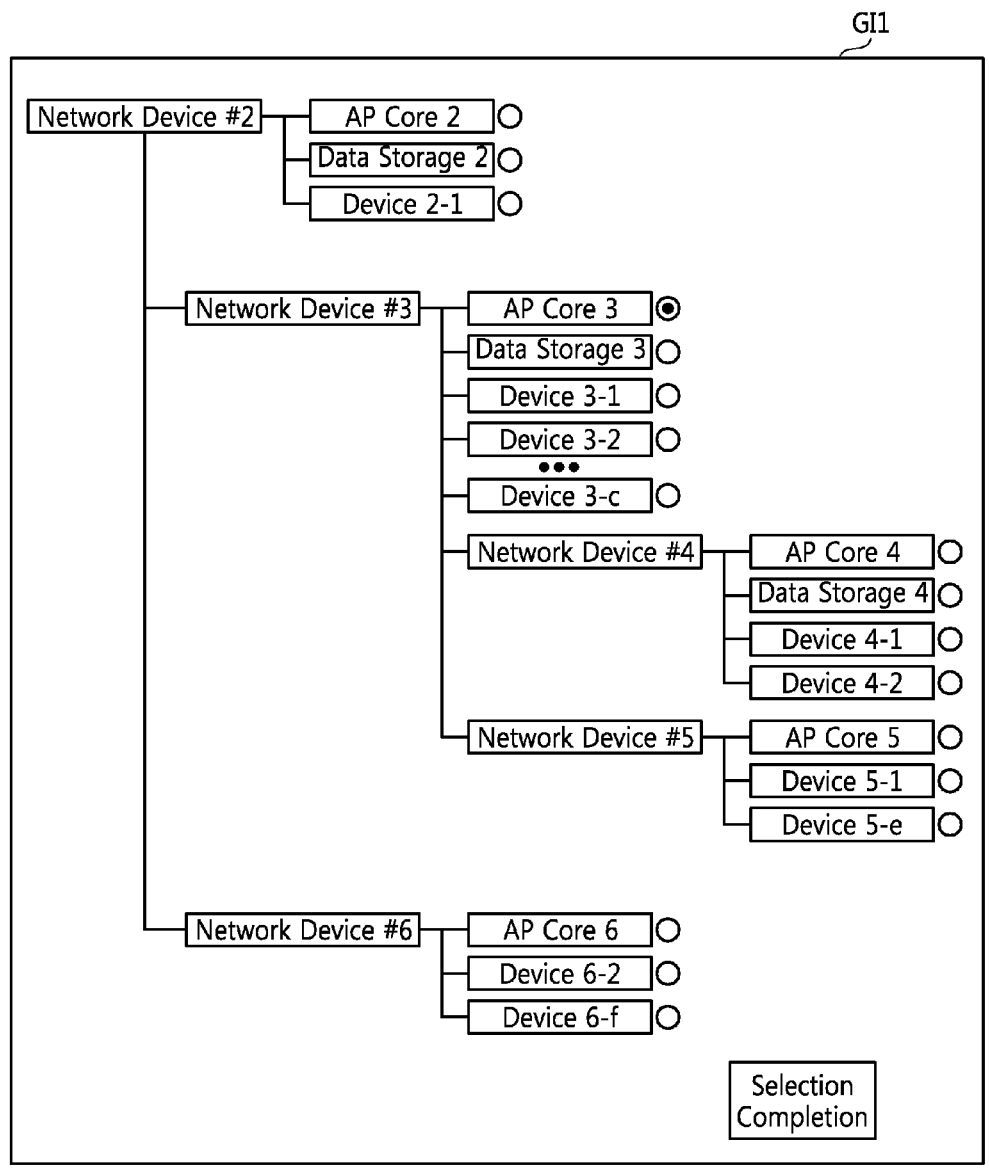
FIG. 8 is a first connection node graph corresponding to second profile/configuration transmitted from the second network device to a first network device in the data flow illustrated in FIG. 6, according to some exemplary embodiments of the inventive concept.

FIG. 8 is a first connection node graph corresponding to the second profile/configuration GI1 transmitted from the second network device 300 to the first network device 200 in the data flow illustrated in FIG. 6. Referring to FIGS. 3 and 4 and FIGS. 6 through 8, the first connection node graph corresponding to the second profile/configuration GI1 may correspond to the shared information PCB illustrated in FIG. 4.

Figure 9:
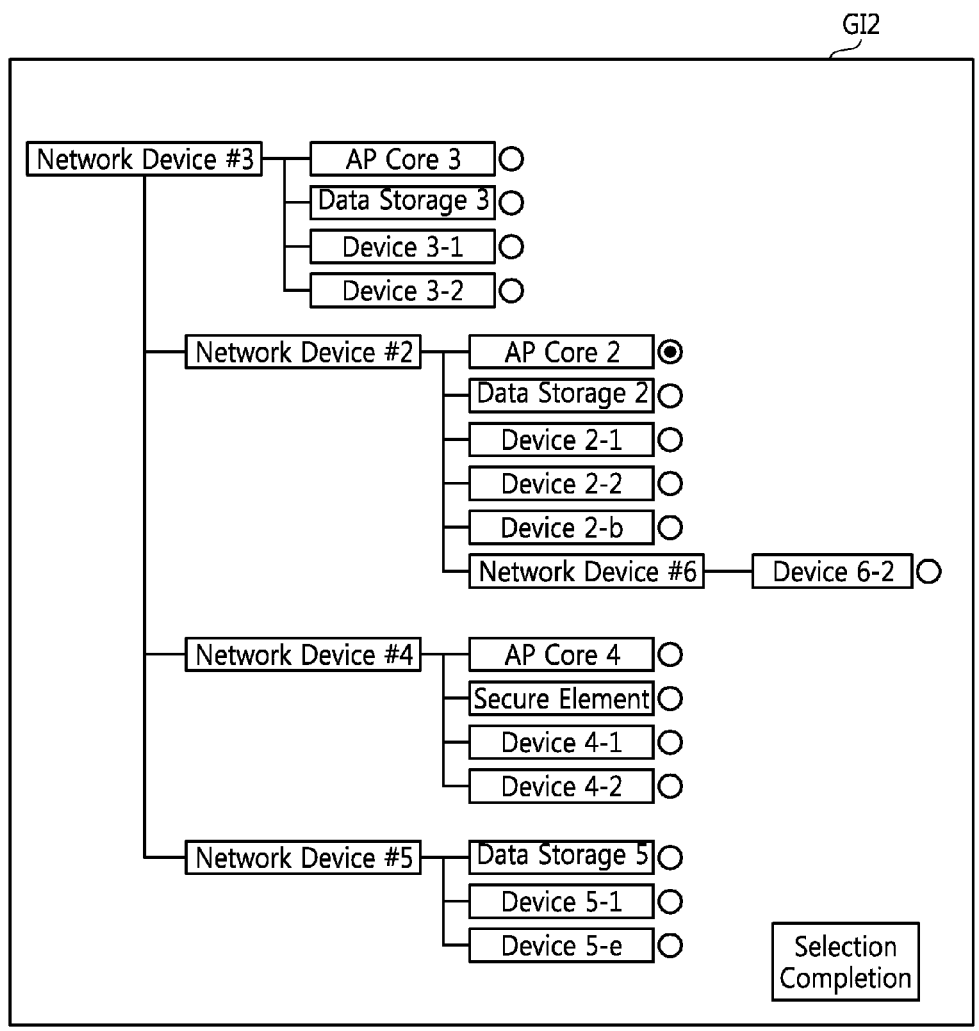
FIG. 9 is a second connection node graph corresponding to third profile/configuration transmitted from the third network device to the first network device in the data flow illustrated in FIG. 6, according to some exemplary embodiments of the inventive concept.

FIG. 9 is a second connection node graph corresponding to the third profile/configuration GI2 transmitted from the third network device 400 to the first network device 200 in the data flow illustrated in FIG. 6. Referring to FIG. 3, FIGS. 5 through 7, and FIG. 9, the second connection node graph corresponding to the third profile/configuration GI2 may correspond to the shared information PCI2 illustrated in FIG. 5.

The user may select at least one hardware resource to be shared with the first network device 200 from among hardware resources in the first and second connection node graphs. When at least one hardware resource is selected by the user, the mobile computing device 800 or the input/output interface 201-0 may transmit shared information regarding the at least one selected hardware resource to the first network device 200. The first network device 200 may transmit the shared information from the connectivity module 210 to the resource management module 230A or 230B. The resource management module 230A or 230B may update profile/configuration stored in the profile/configuration storage 235 based on the shared information. According to another exemplary embodiment, when at least one hardware resource is selected by the user, the mobile computing device 800 or the input/output interface 201-0 may transmit hardware selection information about the at least one selected hardware resource to the first network device 200 so that the resource management module 230A or 230B may update profile/configuration stored in the profile/configuration storage 235 based on the second profile/configuration GI1 and/or the third profile/configuration GI2 which the first network device 200 received from the second network device 300 and the third network device 300 in operations S121-1 and S121-2 of FIG. 6.

For example, when the user selects all of the hardware resources illustrated in FIGS. 8 and 9, the profile/configuration stored in the first profile/configuration storage 235 may be updated with the shared information PCI1 illustrated in FIG. 4 and the shared information PCI2 illustrated in FIG. 5 as the "list of connected network devices/list of connected devices" and/or the "accessible hardware resources" in FIG. 2. When the user selects at least one among hardware resources included in the first network device 200 and/or at least one of network devices connected to the first network device 200 as a hardware resource to be shared, shared information regarding the at least one selected hardware resource may be transmitted to the first network device 200 through the mobile computing device 800 or the input/output interface 201-0. The first network device 200 may update the profile/configuration stored in the profile/configuration storage 235 with the shared information regarding the at least one selected hardware resource. In other words, the at least one selected hardware resource may be a shared hardware resource.

The first network device 200 may transmit the shared information about its shared hardware resource to the second network device 300 and the third network device 400. Accordingly, the resource management module of the second network device 300 may update the second profile/configuration GI1 stored in the second profile/configuration storage 235-2 based on the shared hardware resource information transmitted from the first network device 200. In addition, the resource management module of the third network device 400 may update the third profile/configuration G21 stored in the third profile/configuration storage 235-3 based on the shared hardware resource information transmitted from the first network device 200. Accordingly, the first network device 200 may use at least one of the shared hardware resources of the second network device 300, at least one of the shared hardware resources of the third network device 400, at least one of the shared hardware resources of the fourth network device 500, at least one of the shared hardware resources of the fifth network device 600, and/or at least one of the shared hardware resources of the sixth network device 700 based on the profile/configuration, i.e., the shared information PCI1 and the shared information PCI2 stored in the profile/configuration storage 235.

In addition, each of the network devices 300, 400, 500, 600, and 700 may use at least one of the shared hardware resources of the first network device 200. In other words, the new first network device 200 may use at least one hardware resource permitted to be shared by each of the network devices 300, 400, 500, 600, and 700 through the connection with the existing network devices 300, 400, 500, 600, and 700.

The shared information PCI1 and the shared information PCI2 may be changed based on the sharing policy of each of the network devices 300, 400, 500, 600, and 700. At this time, the network devices 200, 300, and 400 may synchronize shared information through communication. Accordingly, when the sharing policy of each of the network devices 300, 400, 500, 600, and 700 is changed, the profile/configuration of each network devices 300, 400, 500, 600, or 700 may be updated.

Figure 10:
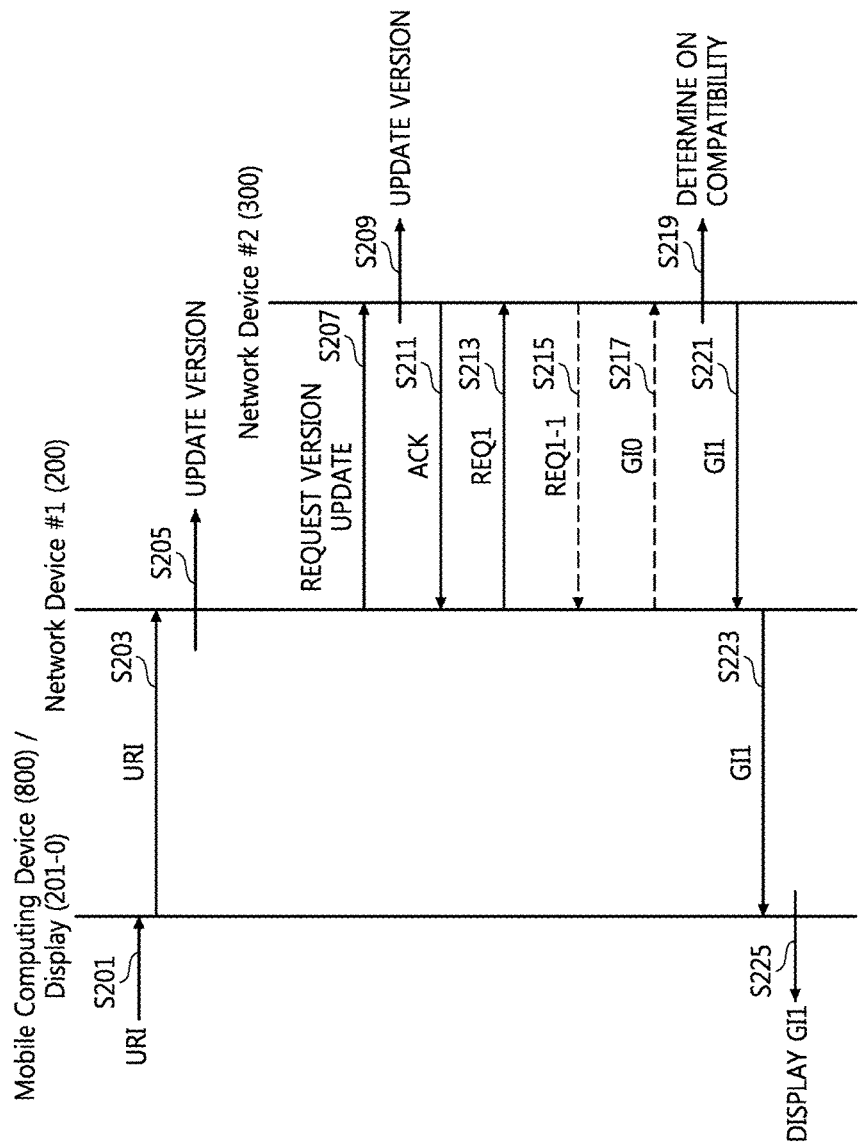
FIG. 10 is a data flow diagram for explaining the operation of the network system illustrated in FIG. 3 according to other embodiments of the inventive concept, according to some exemplary embodiments of the inventive concept.

FIG. 10 is a data flow diagram for explaining operations of the network system 100A illustrated in FIG. 3 according to other exemplary embodiments of the inventive concept. Referring to FIGS. 3, 4, 6, and 8, user information URI regarding the first network device 200 may be set using the mobile computing device 800 or the input/output interface 201-0 in operation S201. The mobile computing device 800 or the input/output interface 201-0 may transmit the user information URI input by the user to the first network device 200 via a wireless or wired communication network in operation S203. The resource management module 230A or 230B of the first network device 200 may store the user information URI received through the connectivity module 210 in the profile/configuration storage 235 as the "user information".

After the user information is stored, the first network device 200 may update its firmware or software resources to the newest version in operation S205. At this time, the update may be performed using firmware over-the-air (FOTA), but the inventive concept is not restricted to the current embodiments.

The connectivity module 210 of the first network device 200 may search for at least one connectable network device through wireless communication (such as Wi-Fi or Bluetooth). When the second network device 300 is detected as a connectable network device, the first network device 200 may transmit a version update request to the second network device 300 through the connectivity module 210 in operation S207. The second network device 300 may update its firmware or software resources to the newest version in response to the version update request in operation S209.

After the version update of the second network device 300 is completed, the second network device 300 may transmit a completion reply ACK to a first network device 200 in operation S211. The first network device 200 may transmit the first request REQ1 to the resource management module of the second network device 300 based on the completion reply ACK in operation S213.

The resource management module of the second network device 300 may determine whether the first network device 200 is connectable or compatible with the second network device 300 based on the first request REQ1 in operation S219. When it is determined that the first network device 200 is connectable or compatible with the second network device 300, the resource management module of the second network device 300 may transmit the second profile/configuration GI1 stored in the second profile/configuration storage 235-2 to the first network device 200 in operation S221.

When it is necessary to tighten up the access security between the first network device 200 and the second network device 300, the resource management module of the second network device 300 may transmit the third request REQ1-1 requesting the profile/configuration of the first network device 200 to the resource management module 230A or 230B of the first network device 200 in response to the first request REQ1 in operation S215. The resource management module 230A or 230B of the first network device 200 may transmit the first profile/configuration GI0 stored in its profile/configuration storage 235 to the resource management module of the second network device 300 in response to the third request REQ1-1 in operation S217.

However, when the resource management module 230A or 230B of the first network device 200 does not transmit the first profile/configuration GI0 to the second network device 300, the resource management module of the second network device 300 may or may not transmit the second profile/configuration GI1 to the first network device 200 according to a sharing policy.

The first network device 200 may transmit the second profile/configuration GI1 from the second network device 300 to the mobile computing device 800 or the input/output interface 201-0 in operation S223. The mobile computing device 800 or the input/output interface 201-0 may display the second profile/configuration GI1 on the display 810 in operation S225.

As described above with reference to FIG. 6, when at least one of the hardware resources of the first network device 200 and at least one of the hardware resources of the second network device 300 are shared, the resource management module 230A or 230B of the first network device 200 may store shared information in the profile/configuration storage 235 using the user information set in the first network device 200.

Figure 11:
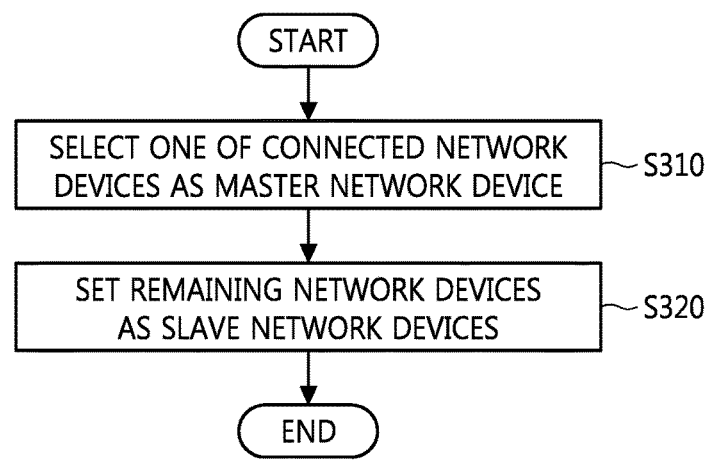
FIG. 11 is a flowchart of a method of selecting a master network device in the network system illustrated in FIG. 3 according to some exemplary embodiments of the inventive concept.

FIG. 11 is a flowchart of a method of selecting a master network device in the network system 100A illustrated in FIG. 3 according to some exemplary embodiments of the inventive concept. As described above with reference to FIG. 6, the user may select at least one of the network devices 200, 300, 400, 500, 600, and 700 connected with one another as a master network device in operation S310.

At least one network device that has not been selected as the master network device may be set as a slave network device in operation S320. At this time, the user may select the master network device and the slave network device using the mobile computing device 800 or the input/output interface 201-0.

When the first network device 200 is not connected with either the second network device 300 or the third network device 400 in FIG. 3, the second network device 300 and the third network device 400 may be selected by the user as master network devices. However, when the first network device 200 is connected with the second and third network devices 300 and 400, the first network device 200 may be selected by the user as the master network device and the second and third network devices 300 and 400 may be selected by the user as slave network devices. When the first network device 200 is set as the master network device, the mobile computing device 800 or the input/output interface 201-0 may transmit configuration information to the first network device 200 and the first network device 200 may transmit the configuration information to the network devices 300, 400, 500, 600, and 700.

Figure 12:
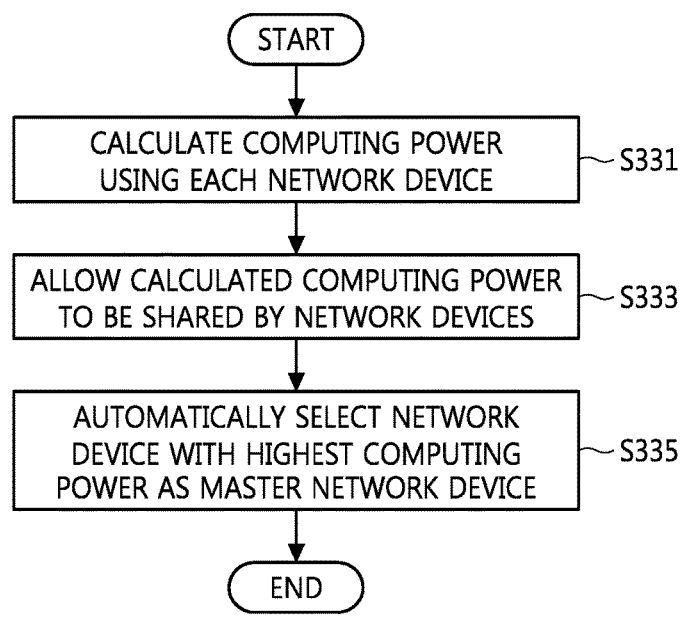
FIG. 12 is a flowchart of a method of selecting a master network device in the network system illustrated in FIG. 3 according to some exemplary embodiments of the inventive concept.

FIG. 12 is a flowchart of a method of selecting a master network device in the network system 100A illustrated in FIG. 3 according to other exemplary embodiments of the inventive concept. With reference to FIG. 6, at least one of the connected network devices 200, 300, 400, 500, 600, and 700 may be automatically selected as a master network device.

An AP core of each of the network devices 200, 300, 400, 500, 600, and 700 may calculate a computing power in operation S331. The computing power may be a performance index indicating how fast an operation can be performed. The computing power calculated by the AP core of each of the network devices 200, 300, 400, 500, 600, and 700 may be shared with the AP cores of the other network devices in operation S333. In other words, a network device may transmit its computing power to and receive a computing power from the other network devices.

The AP cores of the respective network devices 200, 300, 400, 500, 600, and 700 may automatically select, as a master network device, a network device having the highest computing power among the network devices 200, 300, 400, 500, 600, and 700 in operation S335. The network device set as the master network device may transmit configuration information to the other network devices. The computing power of each of the network devices 200, 300, 400, 500, 600, and 700 may be periodically calculated or may be calculated when a new network device is connected to the network system 100A, but the inventive concept is not restricted to the current embodiments. The network device set as the master network device may set the hardware resources of each of the other network devices (i.e., the slave network devices) as shared resources or may relieve them from the shared resources, but the inventive concept is not restricted to the current embodiments.

Figure 13:
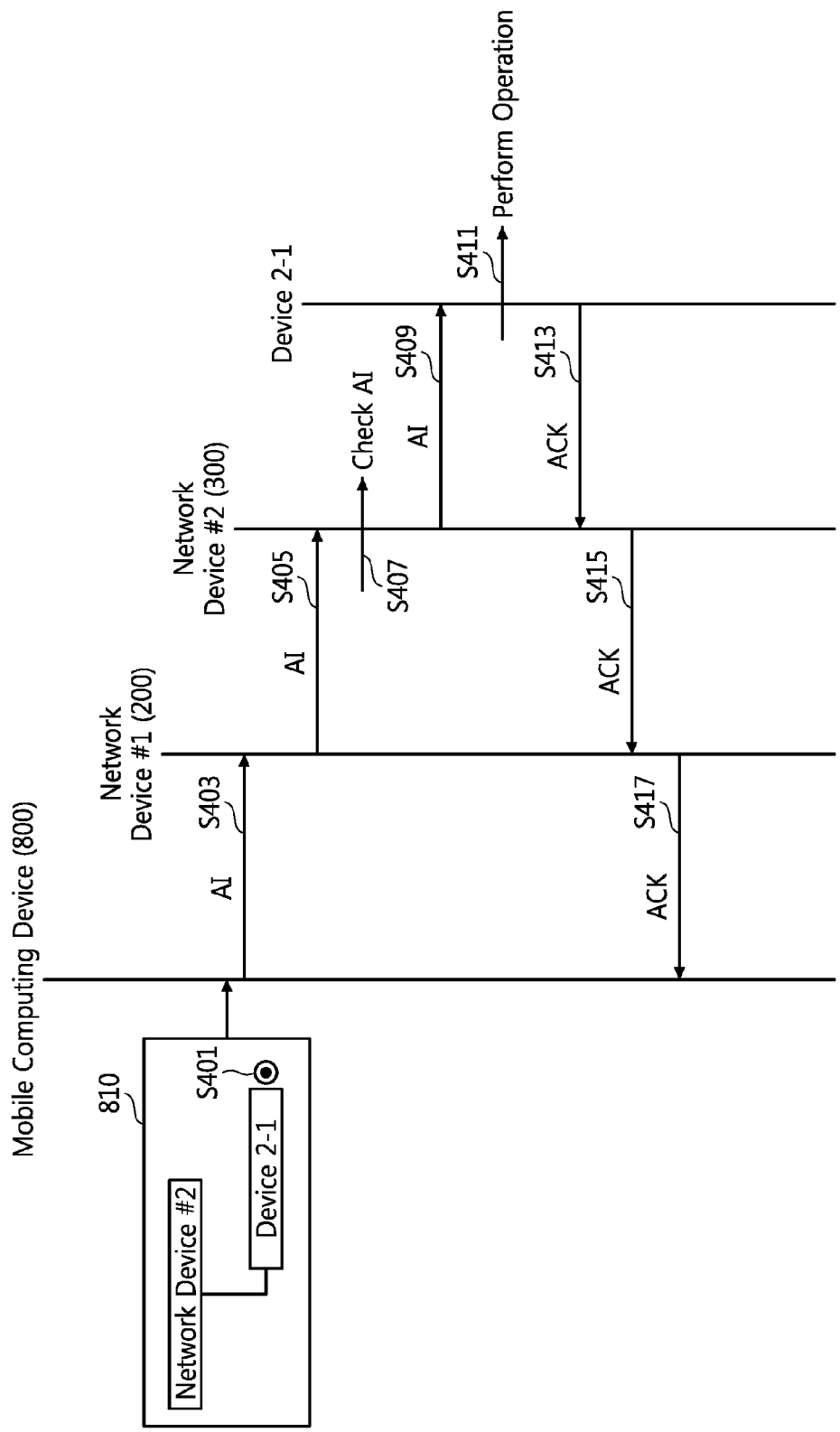
FIG. 13 is a data flow diagram for explaining a procedure in which a first network device controls a device connected to a second network device using a mobile computing device according to some exemplary embodiments of the inventive concept.

FIG. 13 is a data flow diagram for explaining a procedure in which the first network device 200 controls a device connected to the second network device 300 using the mobile computing device 800 according to some exemplary embodiments of the inventive concept. It is assumed that the first and second network devices 200 and 300 illustrated in FIG. 3 share at least one hardware resource through operations described with reference to FIG. 6 or 10.

A user may select a device Device2-1 connected to the second network device 300 as a target of control using the display 810 of the mobile computing device 800 (FIG. 7 and S401). The mobile computing device 800 may generate an actuation instruction AI according to the user's input, and transmit the actuation instruction AI to the connectivity module 210 of the first network device 200 in operation S403. The connectivity module 210 may transmit the actuation instruction AI to the resource management module 230A or 230B of the first network device 200. The actuation instruction AI may include identification information and actuation information of the device Device2-1.

The resource management module 230A or 230B may determine that the device Device2-1 connected to the second network device 300 is a shared hardware resource based on the actuation instruction AI and the shared information PCI1 stored in the profile/configuration storage 235, and transmit the actuation instruction AI to the connectivity module of the second network device 300 through the connectivity module 210 based on the determination result in operation S405. The connectivity module of the second network device 300 may transmit the actuation instruction AI to the resource management module of the second network device 300. The resource management module of the second network device 300 may confirm that the device Device2-1 connected to the second network device 300 is a hardware resource shared by the first and second network devices 200 and 300 based on the actuation instruction AI and the shared information PCI1 stored in the profile/configuration storage 235-2 in operation S407.

The second network device 300 may transmit the actuation instruction AI to an actuator that actuates the device Device2-1 according to the confirmation result in operation S409. The device Device2-1 may perform an operation corresponding to the actuation instruction AI according to the control of the actuator in operation S411. After the operation is completed, the device Device2-1 or the actuator may transmit an acknowledgement ACK to the second network device 300 in operation S413. The second network device 300 may transmit the acknowledgement ACK to the first network device 200 in operation S415. The first network device 200 may transmit the acknowledgement ACK to the mobile computing device 800 in operation S417.

Consequently, the first network device 200 may control the device Device2-1 that is not directly connected to the first network device 200. For instance, when a gas valve, a window, or a front door is open, the device Device2-1 may transmit an indicator signal indicating that the gas valve, the window, or the front door has been open to the mobile computing device 800 through the network devices 200 and 300. When a user lying in a bedroom wants to close the gas valve, the window, or the front door using the device Device2-1 connected to the second network device 300 through the mobile computing device 800, the user may issue the actuation instruction AI for controlling the device Device2-1 using the mobile computing device 800 which can communicated with the first network device 200 connected to the second network device 300. The mobile computing device 800 may receive the acknowledgement ACK indicating that the gas valve, the window, or the front door has been closed by the device Device2-1 through the network devices 200 and 300. Here, the actuation information included in the actuation instruction AI may be a command "close".

Figure 14:
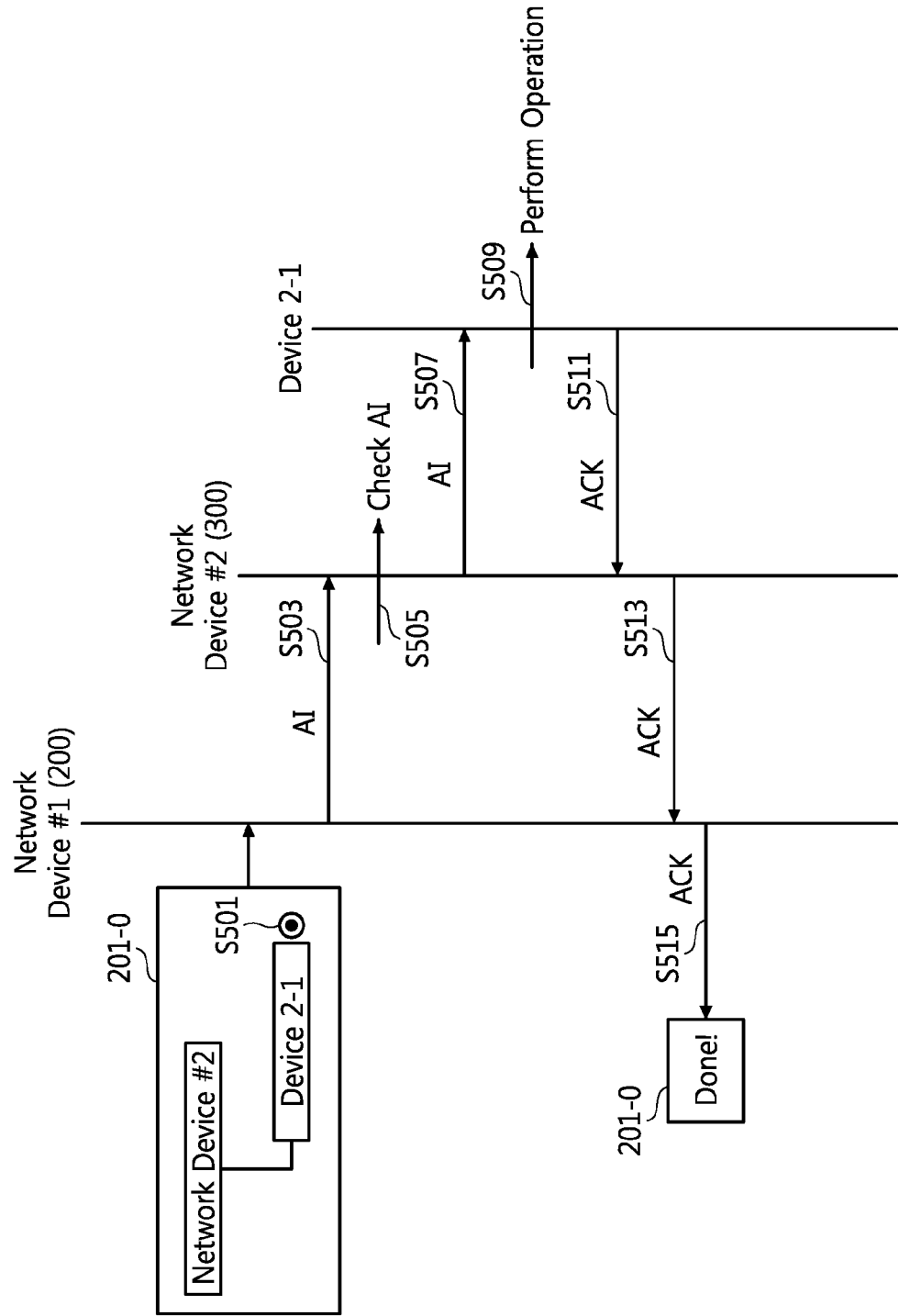
FIG. 14 is a data flow diagram for explaining a procedure in which a first network device controls a device connected to a second network device according to some exemplary embodiments of the inventive concept.

FIG. 14 is a data flow diagram for explaining a procedure in which the first network device 200 controls a device connected to the second network device 300 according to some exemplary embodiments of the inventive concept. It is assumed that the first and second network devices 200 and 300 illustrated in FIG. 3 share at least one hardware resource through operations described with reference to FIG. 6 or 10.

A user may select the device Device2-1 connected to the second network device 300 as a target of control using the input/output interface 201-0 (FIG. 7 and S501). The input/output interface 201-0 may generate an actuation instruction AI according to the user's input and may transmit the actuation instruction AI to the connectivity module 210 of the first network device 200 in operation S503. The connectivity module 210 may transmit the actuation instruction AI to the resource management module 230A or 230B of the first network device 200. The actuation instruction AI may include identification information and actuation information of the device Device2-1.

The resource management module 230A or 230B may determines that the device Device2-1 connected to the second network device 300 is a shared hardware resource based on the actuation instruction AI and the shared information PCI1 stored in the profile/configuration storage 235, and may transmit the actuation instruction AI to the connectivity module of the second network device 300 through the connectivity module 210 based on the determination result in operation S503. The connectivity module of the second network device 300 may transmit the actuation instruction AI to the resource management module of the second network device 300. The resource management module of the second network device 300 may confirm that the device Device2-1 connected to the second network device 300 is a hardware resource shared by the first and second network devices 200 and 300 based on the actuation instruction AI and the shared information PCI1 stored in the profile/configuration storage 235-2 in operation S505.

The second network device 300 may transmit the actuation instruction AI to an actuator that actuates the device Device2-1 according to the confirmation result in operation S507. The device Device2-1 may perform an operation corresponding to the actuation instruction AI according to the control of the actuator in operation S509. After the operation is completed, the device Device2-1 or the actuator may transmit an acknowledgement ACK to the second network device 300 in operation S511. The second network device 300 may transmit the acknowledgement ACK to the first network device 200 in operation S513. The first network device 200 may transmit the acknowledgement ACK to the input/output interface 201-0 in operation S515.

Consequently, the first network device 200 may control the device Device2-1 that is not directly connected to the first network device 200. For instance, when the first network device 200 is a smart refrigerator and the device Device2-1 is a closed-circuit television (CCTV) connected to the second network device 300 that manages a garage, the smart refrigerator may generate the actuation instruction AI for controlling a rotation direction of the CCTV according to the user's input. The actuation instruction AI may be transmitted to the CCTV through the network devices 200 and 300. Once the rotation direction of the CCTV is controlled, the acknowledgement ACK output from the CCTV may be transmitted to the input/output interface 201-0 through the network devices 200 and 300 and video filmed by the CCTV may be played in the input/output interface 201-0 through the network devices 200 and 300.

Figure 15:
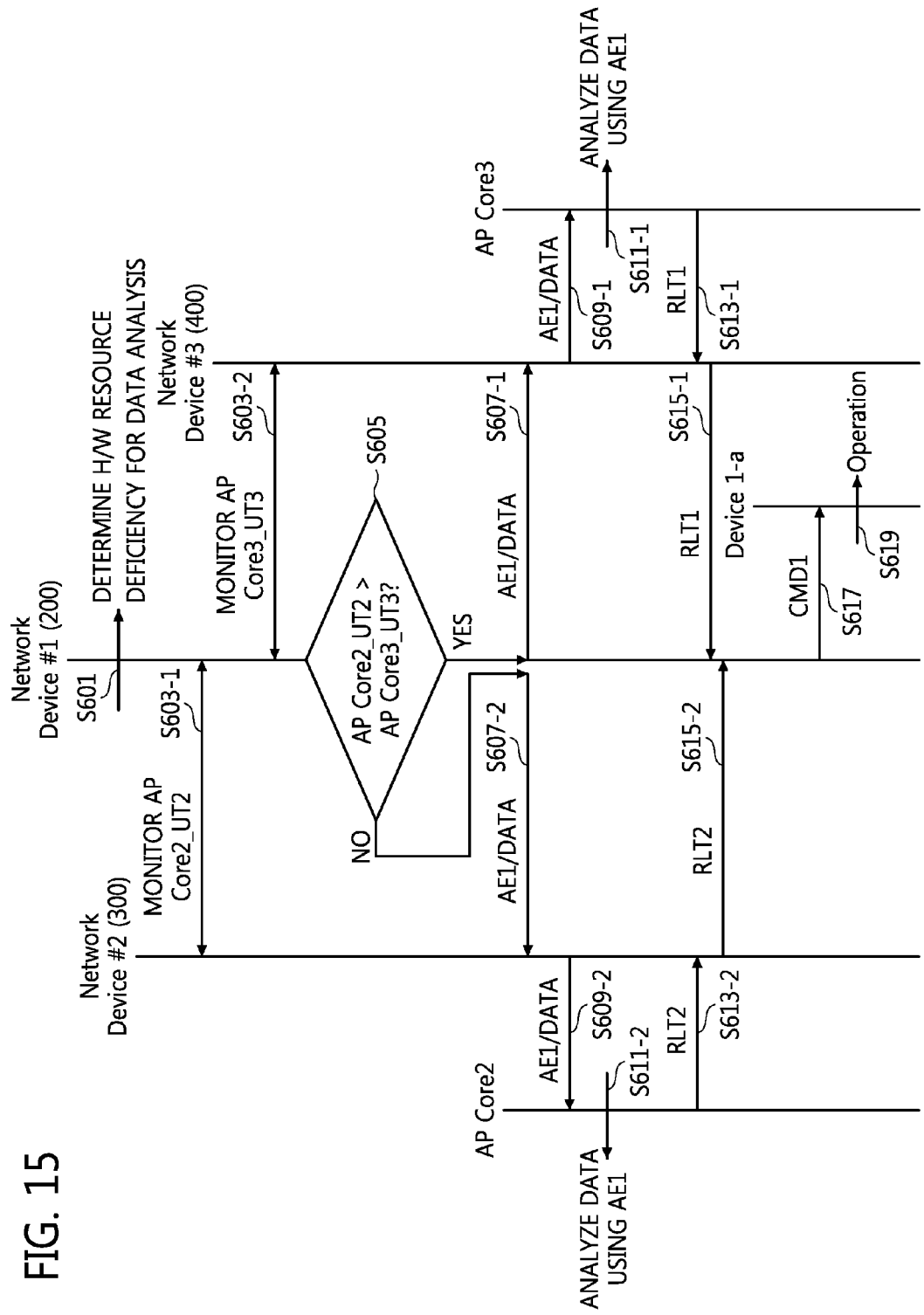
FIG. 15 is a data flow diagram for explaining a procedure in which data transmitted from a first network device is analyzed by other network device using its computing power according to some exemplary embodiments of the inventive concept.

FIG. 15 is a data flow diagram for explaining a procedure in which data transmitted from the first network device 200 is analyzed by another network device using its computing power according to some exemplary embodiments of the inventive concept. It is assumed that the resource management module 230A or 230B is implemented in hardware and/or software and an analytic engine AE1 executed in the first network device 200 is implemented in software. A method by which the first network device 200 transmits its software analytic engine AE1 and data to the second or third network device 300 or 400 will be described with reference to FIGS. 1G through 12 and FIG. 15.

When the AP core 251 of the first network device 200 is a CPU, the resource management module 230A or 230B may analyze at least one among CPU utilization, CPU usage, and CPU occupancy. In other words, the resource management module 230A or 230B may determine whether hardware resources for analyzing the data are deficient in operation S601. For example, while the version of firmware or software installed in the first network device 200 is being updated, the CPU utilization may increase. When the CPU usage is high and it is necessary to analyze the data sensed by at least one of the devices 201-1 through 201-a, hardware resources in the first network device 200 may be deficient to analyze the data in operation S601.

The first network device 200 may monitor a usage AP Core2_UT2 of an AP core of the second network device 300 in operation S603-1. The first network device 200 may also monitor a usage AP Core3_UT3 of an AP core of the third network device 400 in operation S603-2.

Operations S603-1 and S603-2 may be performed in real time or on the fly. Operations S603-1 and S603-2 may be performed before or simultaneously (or in parallel) with operation S601. The first network device 200 may request AP core usages AP Core2_UT2 and AP Core3_UT3 from the respective network devices 300 and 400, and receive the AP core usages AP Core2_UT2 and AP Core3_UT3 from the network devices 300 and 400, respectively.

The resource management module 230A or 230B or the AP core 251 of the first network device 200 may compare the AP core usage AP Core2_UT2 of the second network device 300 with the AP core usage AP Core3_UT3 of the third network device 400 in operation S605. When the AP core usage AP Core2_UT2 of the second network device 300 is greater than the AP core usage AP Core3_UT3 of the third network device 400, the resource management module 230A or 230B or the AP core 251 may transmit the analytic engine AE1 and the data of the first network device 200 to the third network device 400 in operation S607-1. The resource management module of the third network device 400 may transmit the analytic engine AE1 and the data to the AP core AP Core3 of the third network device 400 in operation S609-1. The AP core AP Core3 may analyze the data using the analytic engine AE1 in operation S611-1 and may transmit a first analysis result RLT1 to the resource management module of the third network device 400 in operation S613-1. The resource management module may transmit the first analysis result RLT1 to the first network device 200 in operation S615-1.

However, when the AP core usage AP Core2_UT2 of the second network device 300 is not greater than the AP core usage AP Core3_UT3 of the third network device 400, the resource management module 230A or 230B or the AP core 251 may transmit the analytic engine AE1 and the data of the first network device 200 to the second network device 300 in operation S607-2. The resource management module of the second network device 300 may transmit the analytic engine AE1 and the data to the AP core AP Core2 of the second network device 300 in operation S609-2. The AP core AP Core2 may analyze the data using the analytic engine AE1 in operation S611-2 and may transmit a second analysis result RLT2 to the resource management module of the second network device 300 in operation S613-2. The resource management module may transmit the second analysis result RLT2 to the first network device 200 in operation S615-2.

The resource management module 230A or 230B of the first network device 200 may transmit the analysis result RLT1 or RLT2 to the AP core 251. The AP core 251 may transmit a first command CMD1 to the actuator 270-a, which drives a device Device1-a, based on the analysis result RLT1 or RLT2 in operation S617. The actuator 270-a may drive the device Device1-a based on the first command CMD1 in operation S619.

Figure 16:
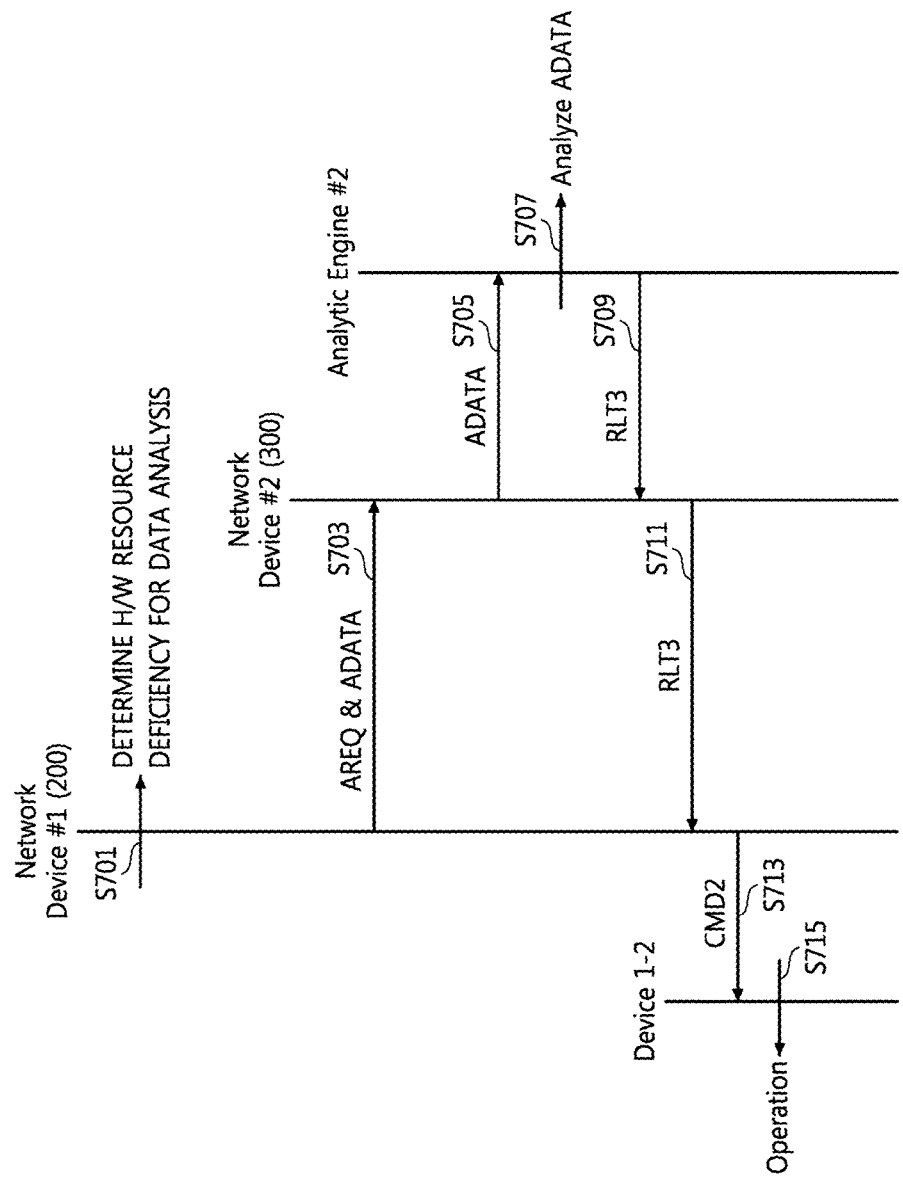
FIG. 16 is a data flow diagram for explaining a procedure in which data transmitted from a first network device is analyzed by other network device using its analytic engine according to some exemplary embodiments of the inventive concept.

FIG. 16 is a data flow diagram for explaining a procedure in which data transmitted from the first network device 200 is analyzed by another network device using its analytic engine according to some embodiments of the inventive concept. It is assumed that a resource management module and an analytic engine included in each of the network devices 200 and 300 are implemented in hardware and/or software. A method by which the first network device 200 transmits data to the second network device 300 will be described with reference to FIGS. 1A through 12 and FIG. 15.

The resource management module 230A or 230B of the first network device 200 determines whether hardware resources are deficient to analyze data ADATA in operation S701. For instance, when the performance of the analytic engine of the first network device 200 is lower than that of the second network device 300, the resource management module 230A or 230B of the first network device 200 may transmit the data ADATA output from the device Device1-2 and an analysis request AREQ to the second network device 300 in operation S703. The analytic engine implemented in each of the network devices 200 and 300 may perform encoding and decoding.

The resource management module of the second network device 300 may transmit the data ADATA and the analysis request AREQ to the AP core of the second network device 300. The AP core of the second network device 300 may transmit the data ADATA to Analytic Engine#2 implemented in the second network device 300 in response to the analysis request AREQ in operation S705. Alternatively, the resource management module of the second network device 300 may directly transmit the data ADATA and the analysis request AREQ to Analytic Engine#2 in operation S705.

Analytic Engine#2 may analyze the data ADATA in operation S707 and may transmit an analysis result RLT3 to the resource management module of the second network device 300 in operation S709. The resource management module of the second network device 300 may transmit the analysis result RLT3 to the resource management module 230A or 230B of the first network device 200 in operation S711.

The resource management module 230A or 230B may transmit the analysis result RLT3 to the AP core 251. The resource management module 230A or 230B or the AP core 251 may generate a second command CMD2 based on the analysis result RLT3 and may transmit the second command CMD2 to the actuator 270-2 driving the device Device1-2 in operation S713. The actuator 270-2 may drive the device Device1-2 based on the second command CMD2 in operation S715.

For instance, when the analytic engine of the second network device 300 can process high-resolution image data and the analytic engine of the first network device 200 processes low-resolution image data, the first network device 200 may transmit the data ADATA taken by the device Device1-2 to the second network device 300.

Figure 17:
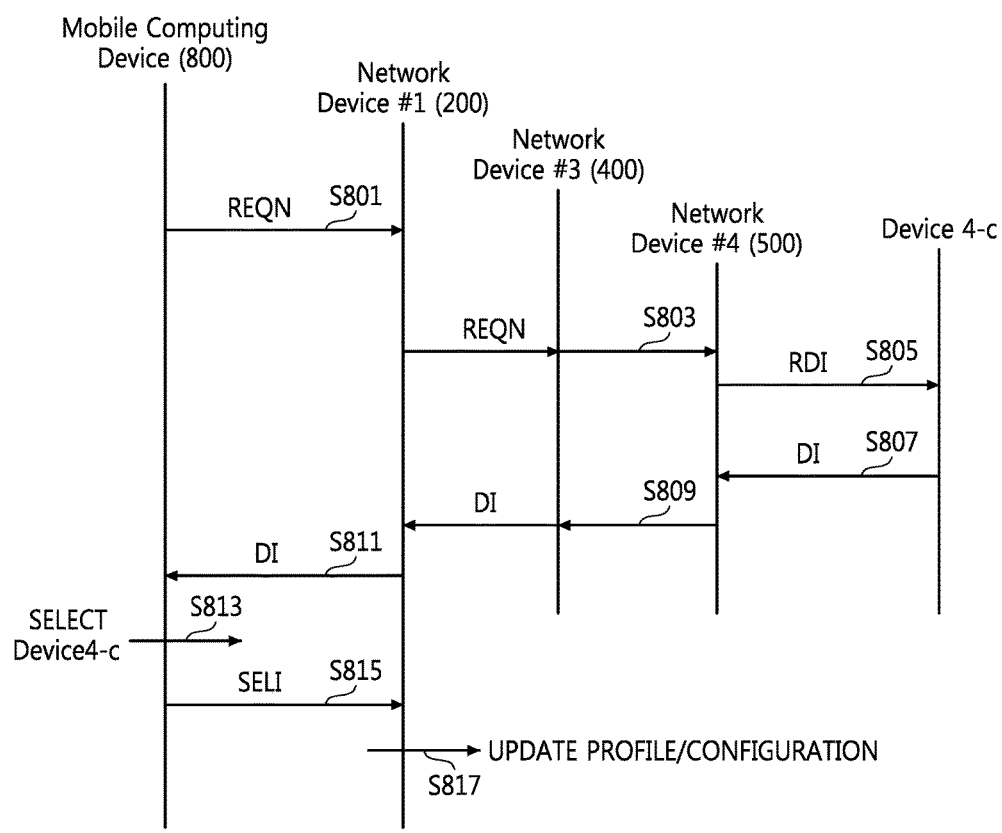
FIG. 17 is a data flow diagram for explaining a procedure in which a first network device sets a device connected to a fourth network device as a shared resource according to some exemplary embodiments of the inventive concept.

FIG. 17 is a data flow diagram for explaining a procedure in which the first network device 200 sets a device connected to the fourth network device 500 as a shared resource according to some exemplary embodiments of the inventive concept. A procedure for setting or adding a device Device4-c connected to the fourth network device 500 as a shared resource will be described with reference to FIGS. 3, 9, and 17.

A user may issue an add request REQN for adding the device Device4-c as a shared hardware resource to the first network device 200 using the mobile computing device 800 in operation S801. As described above with reference to FIG. 6 or 10, the user may issue the add request REQN for adding the device Device4-c as a shared hardware resource to the first network device 200 using the input/output interface 201-0 in operation S801. The add request REQN may include identification information of the device Device4-c and a device information request RDI.

When the device Device4-c is newly set as a shared hardware resource, hardware of the device Device4-c is changed, or the version of firmware of the device Device4-c is upgraded, the fourth network device 500 may transmit a change indicator signal to the third network device 400. The third network device 400 may transmit the change indicator signal to the first network device 200, and the resource management module 230A or 230B of the first network device 200 may transmit the change indicator signal to the mobile computing device 800 or the input/output interface 201-0. The mobile computing device 800 or the input/output interface 201-0 may receive first change information, which indicates that any of sharing conditions and shared information of each network device included in the network system 100A illustrated in FIG. 3 is changed, and/or second change information, which indicates that any of sharing conditions and shared information of a device connected to each network device is changed, from the first network device 200. The user may add or change a hardware or software resource to be shared and/or a shared hardware resource using the mobile computing device 800 or the input/output interface 201-0.

The first network device 200 may transmit the add request REQN to the fourth network device 500 through the third network device 400 in operation S803. A resource management module of the fourth network device 500 may interpret the add request REQN, generate the device information request RDI based on the interpretation result, and transmit the device information request RDI to the device Device4-c in operation S805. The device Device4-c may transmit device information DI to the resource management module of the fourth network device 500 in response to the device information request RDI in operation S807. The device information DI may include the sharing condition information and/or shared information illustrated in FIG. 2.

The resource management module of the fourth network device 500 may transmit the device information DI to the resource management module of the third network device 400 and the resource management module of the third network device 400 may transmit the device information DI to the resource management module 230A or 230B of the first network device 200 in operation S809.

The resource management module 230A or 230B of the first network device 200 may transmit the device information DI to the mobile computing device 800 in operation S811. The user may select the device Device4-c as a shared hardware resource based on the device information DI in operation S813. The mobile computing device 800 may transmit a selection signal SELI indicating that the device Device4-c has been selected as a shared hardware resource to the resource management module 230A or 230B of the first network device 200 in operation S815. The resource management module 230A or 230B of the first network device 200 may update profile/configuration stored in the profile/configuration storage 235 based on the selection signal SELI in operation S817. As a result, the device Device4-c is added as a shared hardware resource.

Figure 18:
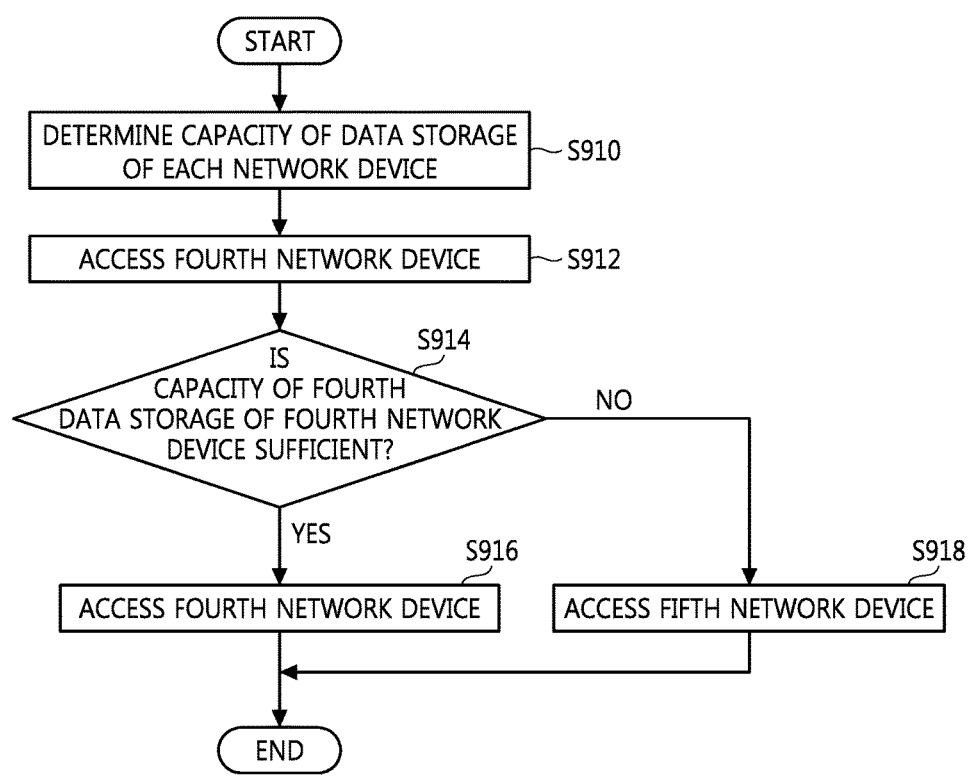
FIG. 18 is a flowchart of a method of determining a sharable network device based on the capacity of a data storage included in each of network devices according to some exemplary embodiments of the inventive concept.

FIG. 18 is a flowchart of a method of determining a sharable network device based on a capacity of a data storage included in each of network devices according to some exemplary embodiments of the inventive concept. Referring to FIGS. 1A through 10 and FIG. 18, the resource management module of the third network device 400 may detect or monitor an available memory capacity of the fourth network device 500 and an available memory capacity of the fifth network device 600 in operation S910.

The available memory capacity of the fourth network device 500 may include an available memory capacity of a data storage in the fourth network device 500 and/or an available memory capacity of at least one data storage connected to the fourth network device 500. The available memory capacity of the fifth network device 600 may include an available memory capacity of a data storage in the fifth network device 600 and/or an available memory capacity of at least one data storage connected to the fifth network device 600.

When the first network device 200 uses the available memory capacity of the fourth network device 500 as a shared hardware resource, i.e., when the first network device 200 accesses the fourth network device 500, the first network device 200 may transmit a sharing request signal to the third network device 400 in operation S912. The resource management module of the third network device 400 may determine whether the available memory capacity of the fourth network device 500 is sufficient based on the determination result obtained in operation S910 in response to the sharing request signal in operation S914. It is assumed that the available memory capacity of the fourth network device 500 is sufficient.

When it is determined that the available memory capacity of the fourth network device 500 is sufficient (in case of YES) in operation S914, the resource management module of the third network device 400 may control the fourth network device 500 so that the first network device 200 accesses the fourth network device 500 in operation S916. However, when it is determined that the available memory capacity of the fourth network device 500 is not sufficient (in case of NO) in operation S914, the resource management module of the third network device 400 may control the fifth network device 600 so that the first network device 200 accesses the fifth network device 600 instead of the fourth network device 500 in operation S918.

Figure 19:
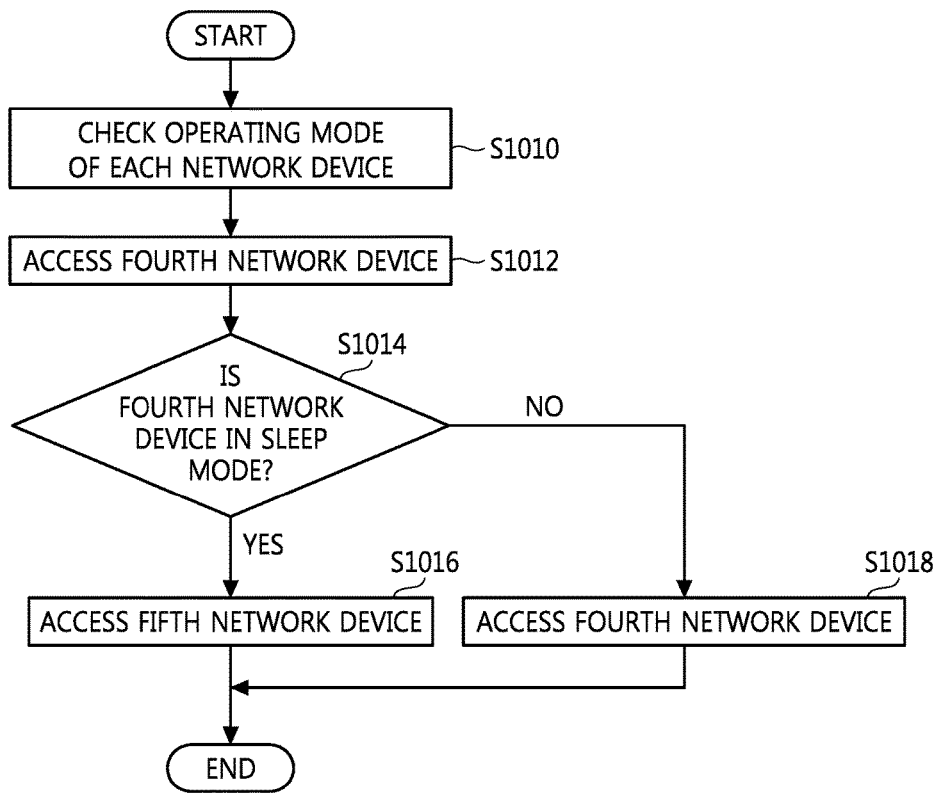
FIG. 19 is a flowchart of a method of determining a sharable network device based on the operating mode of each of network devices according to some exemplary embodiments of the inventive concept.

FIG. 19 is a flowchart of a method of determining a sharable network device based on an operating mode of each of network devices according to some exemplary embodiments of the inventive concept. Referring to FIGS. 1A through 10 and FIG. 19, the resource management module of the third network device 400 may check or monitor an operating mode of the fourth network device 500 and an operating mode of the fifth network device 600 in operation S1010. Here, the operating mode may be a power saving mode like a sleep mode or an active mode for normal operation, but the inventive concept is not restricted to these examples.

When the first network device 200 uses the fourth network device 500 and/or at least one of the devices 501-1 through 501-d connected to the fourth network device 500 as a shared hardware resource, that is, when the first network device 200 accesses the fourth network device 500, the first network device 200 may transmit a sharing request signal to the third network device 400 in operation S1012. The resource management module of the third network device 400 may determine whether the fourth network device 500 is in the sleep mode based on the check result obtained in operation S1010 in response to the sharing request signal in operation S1014. It is assumed that the fifth network device 600 is not in the sleep mode.

When it is determined that the fourth network device 500 is in the sleep mode (in case of YES) in operation S1014, the resource management module of the third network device 400 may control the fifth network device 600 so that the first network device 200 accesses the fifth network device 600 instead of the fourth network device 500 in operation S1016. However, when it is determined that the fourth network device 500 is not in the sleep mode (in case of NO) in operation S1014, the resource management module of the third network device 400 may control the fourth network device 500 so that the first network device 200 accesses the fourth network device 500 in operation S1018. According to an exemplary embodiment, when it is determined that the fourth network device 500 is in the sleep mode (in case of YES) in operation S1014, the resource management module of the third network device 400 may control the fourth network device 500 instead of the fifth network device 600 to relieve overload in the fifth network device 600.

Figure 20:
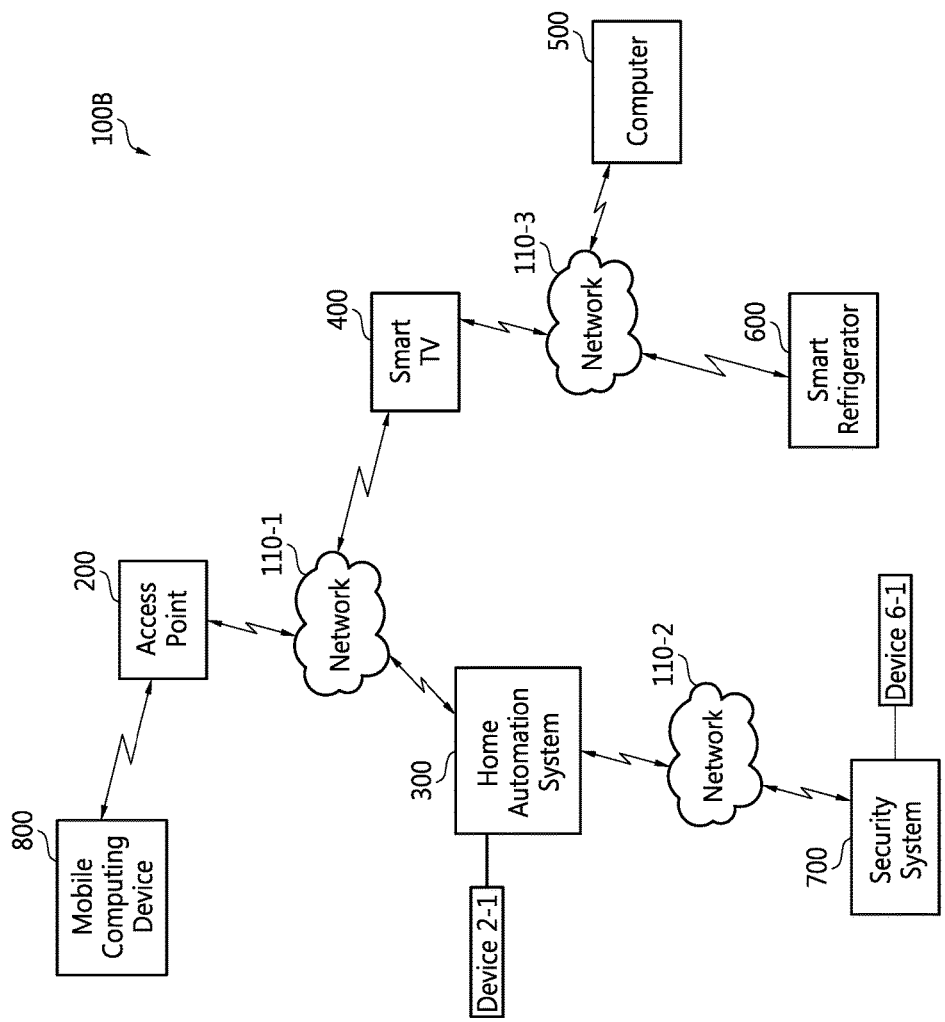
FIG. 20 is a diagram of a network system including network devices according to some exemplary embodiments of the inventive concept.

FIG. 20 is a diagram of a network system 100B according to some exemplary embodiments of the inventive concept. Referring to FIGS. 1A through 20, the network system 100B may include the network devices 200, 300, 400, 500, 600, and 700. The network system 100B may correspond to a home automation network topology. It is assumed that the first network device 200 is an access point, the second network device 300 is a home automation system, the third network device 400 is a smart TV, the fourth network device 500 is a computer, the fifth network device 600 is a smart refrigerator, and the sixth network device 700 is a home security system.

As described above with reference to FIGS. 3 through 19, a user may control on or off of the device Device2-1, e.g., a light, connected to the second network device 300 using the mobile computing device 800 and the first network device 200. The user may control or use the network devices 300, 400, 500, 600, and 700 using the mobile computing device 800 and the first network device 200. When the device Device6-1 is a CCTV camera, the user may control a direction of the CCTV camera, which is not directly connected to the access point 200, using the mobile computing device 800. Although a device is not connected to each of the network devices 200, 400, 500, 600, and 700 in the embodiments illustrated in FIG. 20, at least one device may be connected to each of the network devices 200, 400, 500, 600, and 700 as shown in FIG. 3 in other embodiments.

Figure 21:
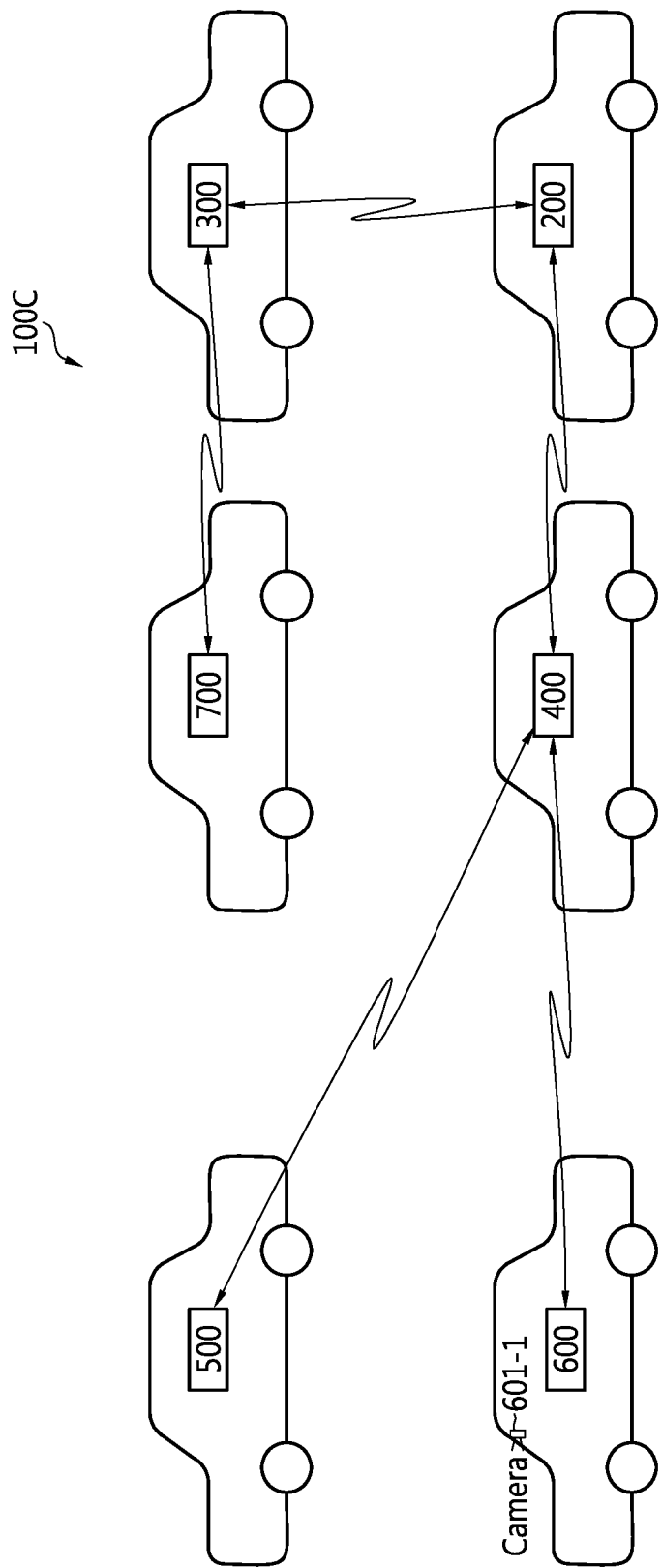
FIG. 21 is a diagram of a network system including network devices according to some exemplary embodiments of the inventive concept.

FIG. 21 is a diagram of a network system 100C according to some exemplary embodiments of the inventive concept. Referring to FIGS. 1A through 19 and FIG. 21, the network system 100C may include the network devices 200, 300, 400, 500, 600, and 700 each corresponding to an automobile, a car, or a vehicle.

A new network device, i.e., the first network device 200, may be connected to the network devices 300 and 400 using the method described above. The first network device 200 may use a device 601-1, e.g., a car front camera, connected to the fifth network device 600 as a shared hardware resource. A driver of a car including the first network device 200 can view video transmitted from the car front camera 601-1 using a display connected to the first network device 200.

Figure 22:
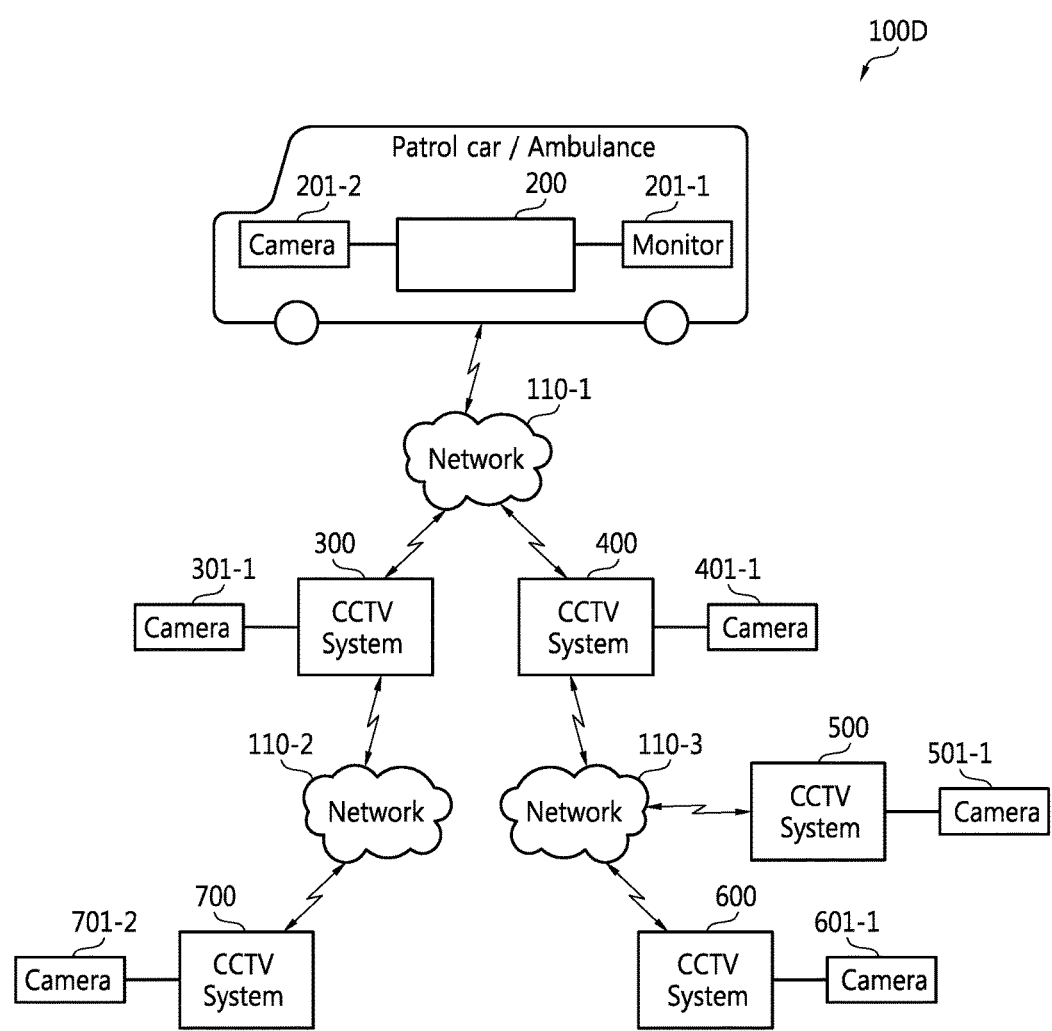
FIG. 22 is a diagram of a network system including network devices according to some exemplary embodiments of the inventive concept.

FIG. 22 is a diagram of a network system 100D according to some exemplary embodiments of the inventive concept. Referring to FIGS. 1A through 19 and FIG. 22, the network system 100D may include the existing network devices 300, 400, 500, 600, and 700 and the new network device 200. The new network device, i.e., the first network device 200 may be connected to the network devices 300 and 400 using the method described above.

It is assumed that a patrol car or an ambulance includes the first network device 200 and devices 201-1 and 201-2, the network devices 300, 400, 500, 600, and 700 are CCTV systems installed at different places, and CCTV cameras 301-1, 401-1, 501-1, 601-1, and 701-1 are respectively connected to the network devices 300, 400, 500, 600, and 700. When the first network device 200 is connected to the network devices 300 and 400, the first network device 200 may use the CCTV cameras 301-1, 401-1, 501-1, 601-1, and 701-1 as shared hardware resources.

When a control signal is input to the monitor 201-1 connected to the first network device 200 installed at the patrol car or ambulance, the first network device 200 may control the shared hardware resources 301-1, 401-1, 501-1, 601-1, and 701-1, may receive video from the shared hardware resources 301-1, 401-1, 501-1, 601-1, and 701-1, and may transmit the video to the monitor 201-1. For instance, when a criminal runs away, a policeman can view video transmitted from the shared hardware resources 301-1, 401-1, 501-1, 601-1, and 701-1 on the monitor 201-1, thereby detecting the criminal's escape route. In addition, an ambulance worker can view video transmitted from the shared hardware resources 301-1, 401-1, 501-1, 601-1, and 701-1 on the monitor 201-1 and thereby judge a situation of a scene of an accident.

Figure 23:
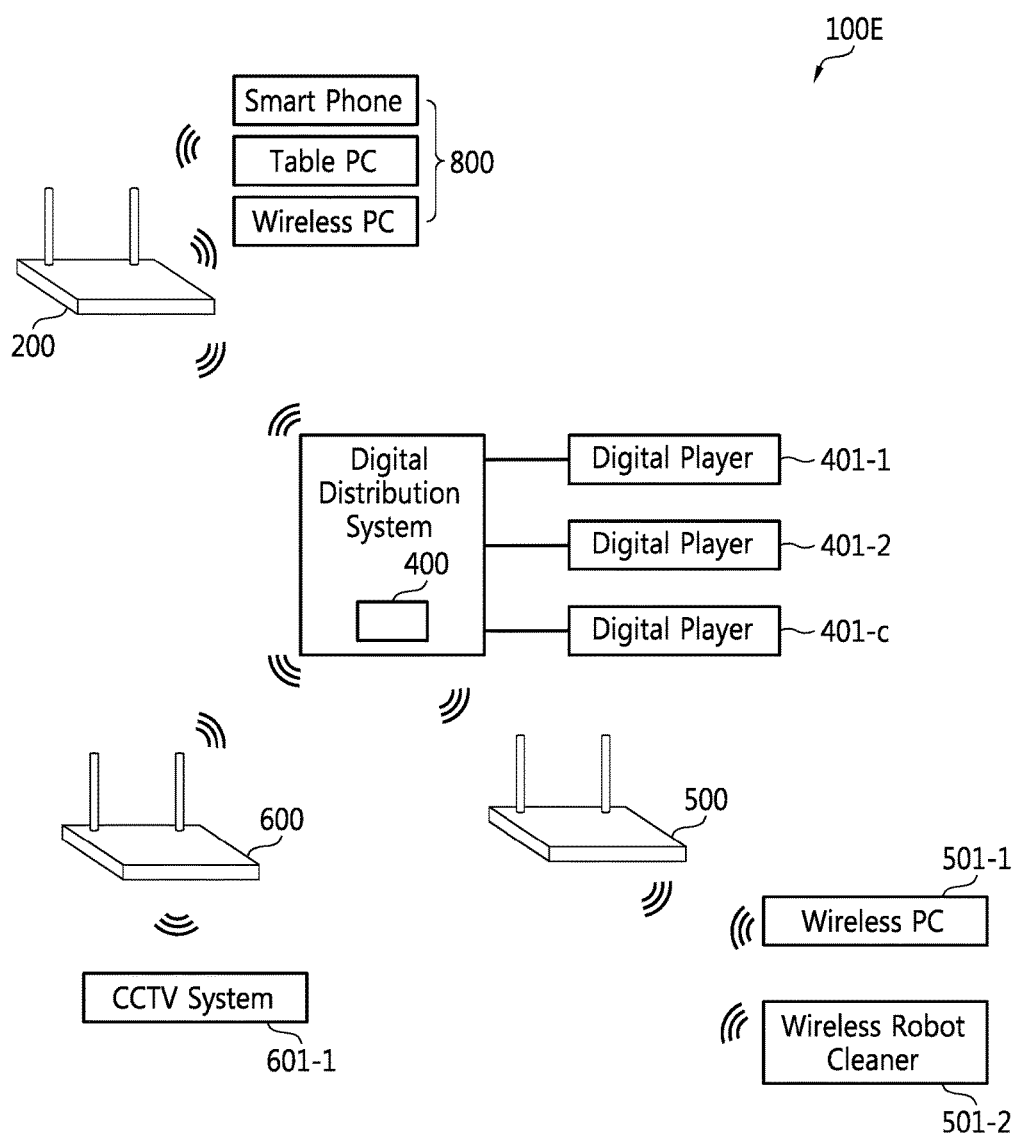
FIG. 23 is a diagram of a network system including network devices according to some exemplary embodiments of the inventive concept.

FIG. 23 is a diagram of a network system 100E according to some exemplary embodiments of the inventive concept. Referring to FIGS. 1A through 19 and FIG. 23, the network system 100E may include the network devices 200, 400, 500, and 600. It is assumed that the network devices 200, 500, and 600 are different wireless access points; the third network device 400 is included in a digital distribution system; the digital distribution system controls the digital players 401-1, 401-2, and 401-c; the fourth network device 500 communicates with the wireless PC 501-1 and the wireless robot cleaner 501-2; and the fifth network device 600 communicates with the wireless CCTV system 601-1.

The new network device, i.e., the first network device 200, is shared with the existing third network device 400, the first network device 200 may control or use the digital players 401-1, 401-2, and 401-c, the wireless PC 501-1, the wireless robot cleaner 501-2, and the wireless CCTV system 601-1 as shared hardware resources. A user may access the first network device 200 using the mobile computing device 800 and may control or use the digital players 401-1, 401-2, and 401-c, the wireless PC 501-1, the wireless robot cleaner 501-2, and the wireless CCTV system 601-1 as the shared hardware resources using the mobile computing device 800. The mobile computing device 800 may be a smart phone, a tablet PC, or a wireless PC but is not restricted thereto.

Figure 24:
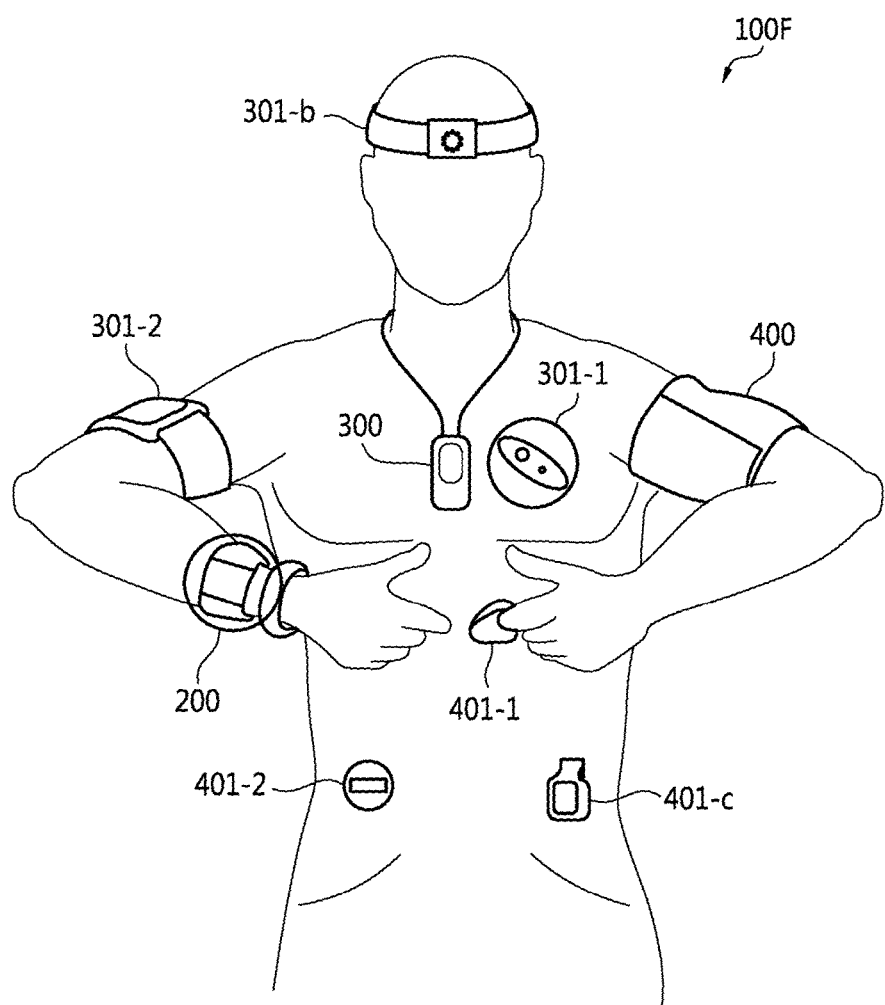
FIG. 24 is a diagram of a network system including network devices according to some exemplary embodiments of the inventive concept.

FIG. 24 is a diagram of a network system 100F according to some exemplary embodiments of the inventive concept. Referring to FIGS. 1A through 19 and FIG. 24, the network system 100F may include the network devices 200, 300, and 400. It is assumed that the first network device 200 is a smart watch, the second network device 300 is a fall detection sensor, the third network device 400 is a blood pressure sensor, the device 301-1 is a stress detection sensor, the device 301-2 is a calorie sensor, the device 301-b is a sleep sensor for inducing sleep, the device 401-1 is an oxygen saturation sensor, the device 401-2 is a skin temperature sensor, and the device 401-c is a pedometer.

When the new network device, i.e., the first network device 200, is shared with the existing network devices 300 and 400, the first network device 200 may control or use the devices 301-1, 301-2, 301-b, 401-1, 401-2, and 401-c as shared hardware resources. For instance, a user may let data from the devices 301-1, 301-2, 301-b, 401-1, 401-2, and 401-c displayed on the display 201-0 connected to the first network device 200.

As described above, according to the above exemplary embodiments of the inventive concept, an SoC uses at least one resource among hardware and software resources of at least one another network device through the connection with the other network device. The SoC transmits its own software and/or data to the other network device and receives data analyzed by the software executed by the hardware resource. Consequently, the SoC uses computing power of the other network device. Moreover, since the SoC transmits its own data to the other network device and receives data analyzed by at least one among the hardware and software resources of the other network device, the SoC uses the computing power of the other network device.

According to the above exemplary embodiments of the inventive concept, a network device including an SoC uses at least one resource among hardware and software resources of at least one another network device through the connection with the other network device. In addition, the network device uses computing power of the other network device.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A hub device implemented as a second network device, the hub device comprising:
   a first resource which is implemented as at least one of hardware and software of the hub device;
   a resource management module; and
   a processor configured to control or execute the resource management module to monitor a state of the first resource, and manage a sharing condition of the first resource to be shared by a first network device and the second network device and shared information of at least one second resource which is hardware and/or software, currently shared by the second network device and a third network device.

2. The hub device of claim 1, wherein the sharing condition comprises at least one of a manufacturer name and a model name of the first network device which shares the first resource with the second network device, and
   wherein the shared information comprises at least one of information about the third network device and information about the at least one second resource.

3. The hub device of claim 1, wherein the at least one second resource is included in one of the second network device and the third network device, and comprises at least one of the processor included in the hub device, a processor of the third network device, a data storage, a sensor node, and an analytic engine configured to process data.

4. The hub device of claim 1, wherein the resource management module comprises:
   a resource coordinator configured to manage sharing of the first resource and sharing of the at least one second resource between two network devices;
   a resource manager configured to monitor a current state of the first resource and transmit a monitoring result to the resource coordinator; and
   a manager configured to manage update and storing of the sharing condition and the shared information.

5. The hub device of claim 4, wherein the first resource comprises the processor which is a central processing unit (CPU) of the hub device, and the current state comprises at least one of CPU utilization, CPU usage, and CPU occupancy.

6. The hub device of claim 4, wherein the current state of the first resource comprises at least one of an available memory capacity of the first resource and an operating mode of the second network device.

7. The hub device of claim 1, wherein the first resource comprises an analytic engine that is implemented in software, and the resource management module is configured to transmit the software which implements the analytic engine and data output from the first network device to the first resource, and
   wherein the first resource is configured to analyze the data using the analytic engine, and transmit analyzed data to the first network device through the resource management module.

8. The hub device of claim 1, wherein the first resource comprises an analytic engine that is implemented in software and the processor which is a first central processing unit (CPU) of the hub device, and the at least one second resource is a second CPU included in the third network device, wherein the resource management module is configured to transmit the software which implements the analytic engine and data output from the first network device to one of the first CPU and the second CPU based on usage of the first CPU and usage of the second CPU, and wherein, in response to analyzing the data using the analytic engine by the one of the first CPU and the second CPU, the resource management module is configured to receive the analyzed data and transmit the analyzed data to the first network device.

9. The hub device of claim 1, further comprising an actuator configured to actuate one of a driving device and a sensor node, wherein the resource management module is configured to transmit an actuation instruction output from the first network device to the actuator, and the actuator is configured to control actuation of one of the driving device and the sensor node in response to the actuation instruction.

10. The hub device of claim 1, wherein the first resource comprises an analytic engine, wherein the resource management module is configured to transmit data output from the first network device to the analytic engine, wherein the analytic engine is configured to analyze the data, and wherein the resource management module is configured to transmit the analyzed data to the first network device.

11. A hub device implemented as a first network device, the hub device comprising:

a first resource which is implemented as at least one of hardware and software of the hub device;

a resource management module; and a processor configured to control or execute the resource management module to monitor a state of the first resource and a state of at least one second resource included in at least one second network device, respectively, and select at least one of the first network device and the at least one second network device based on a result of the monitoring so that a resource included in the selected network device is used by the first network device, wherein the at least one second resource is implemented as at least one of hardware and software.

12. The hub device of claim 11, wherein the resource management module is configured to receive an instruction from a user regarding selection of the at least one of the first network device and the at least one second network device, transmit information about a result of processing data to the user, and receive an instruction to control a device connected to the at least one of the first network device and the at least one second network device related to the result of the processing the data.

13. The hub device of claim 11, wherein the resource management module is configured to transmit to the selected network device, at least one of data obtained by the first network device and an analytic engine used to process the data, and receive a result of processing the data.

14. The hub device of claim 13, further comprising a storage configured to store profile/configuration information about the at least one second network device, wherein the profile/configuration information comprises information about the at least one second network device and the at least one second resource.

15. A hub device implemented as a second network device, the hub device comprising:

a first resource which is implemented as at least one of hardware and software of the hub device;

a resource management module; and a processor configured to control or execute the resource management module to monitor a state of the first resource and control sharing of at least one of the first resource of the second network device and a second resource included in a third network device by at least two of a first network device, the second network device and the third network device, based on information about the first network device, the second network device, and the third network device.

16. The hub device of claim 15, wherein the resource management module comprises:

a resource coordinator configured to manage sharing of the first resource and sharing of the second resource between two network devices;

a resource manager configured to monitor a current state of the first resource and transmit a monitoring result to the resource coordinator; and a manager configured to manage update and storing of the information about the first network device, the second network device, and the third network device.

17. The hub device of claim 15, further comprising a memory configured to store the information about the first network device, the second network device, and the third network device, wherein the resource management module is configured to transmits at least a part of the information about the first network device, the second network device, and the third network device from the memory to the first network device in response to an information transmission request output from the first network device.

18. The hub device of claim 15, further comprising a memory configured to store the information about the first network device, the second network device, and the third network device, wherein the resource management module is configured to transmit a device information request signal to the first network device in response to an information request signal output from the first network device, receive device information from the first network device, determine whether the first network device and the second network device are compatible with each other based on the device information, and transmit at least a part of the information about the first network device, the second network device, and the third network device from the memory to the first network device in response to determining that the first network device and the second network device are compatible.

19. The hub device of claim 15, wherein when the first resource comprises the processor which is a first central processing unit (CPU) and the second resource comprises a second CPU included in the third network device, wherein the resource management module is configured to transmit an analytic engine and data from the first network device to one of the first CPU and the second CPU based on usage of the first CPU and usage of the second CPU; and wherein in response to analyzing the data using the analytic engine by the one of the first CPU and the second CPU, the resource management module is configured to receive the analyzed data and transmit the analyzed data to the first network device.

20. The hub device of claim 15, further comprising an actuator configured to actuate one of a driving device and a sensor node, wherein the resource management module is configured to transmit an actuation instruction output from the first network device to the actuator and the actuator is configured to control actuation of one of the driving device and the sensor node in response to the actuation instruction.

\* \* \* \* \*